(12) United States Patent
Eronen et al.

(10) Patent No.: US 11,688,385 B2
(45) Date of Patent: Jun. 27, 2023

(54) ENCODING REVERBERATOR PARAMETERS FROM VIRTUAL OR PHYSICAL SCENE GEOMETRY AND DESIRED REVERBERATION CHARACTERISTICS AND RENDERING USING THESE

(71) Applicant: Nokia Technologies Oy, Espoo (FI)

(72) Inventors: Antti Eronen, Tampere (FI); Sujeet Mate, Tampere (FI); Jussi Leppanen, Tampere (FI); Pasi Liimatainen, Lempaala (FI)

(73) Assignee: Nokia Technologies Oy, Espoo (FI)

( * ) Notice: Subject to any disclaimer, the term of this patent is extended or adjusted under 35 U.S.C. 154(b) by 66 days.

(21) Appl. No.: 17/202,863

(22) Filed: Mar. 16, 2021

(65) Prior Publication Data

US 2021/0287651 A1 Sep. 16, 2021

Related U.S. Application Data

(60) Provisional application No. 62/990,092, filed on Mar. 16, 2020.

(51) Int. Cl.
*G10K 15/08* (2006.01)

(52) U.S. Cl.
CPC .................. *G10K 15/08* (2013.01)

(58) Field of Classification Search
CPC .......... H04R 1/34; H04R 1/20; G10K 15/08; G10K 15/02; H04S 7/305; H04S 2420/01; H04S 5/00; H04S 7/30
USPC ............................... 381/63, 61, 66
See application file for complete search history.

(56) References Cited

U.S. PATENT DOCUMENTS

| 6,188,769 B1* | 2/2001 | Jot .................. H04S 7/305 381/63 |
|---|---|---|
| 8,751,029 B2 | 6/2014 | Soulodre |
| 9,961,473 B2 | 5/2018 | Schlecht et al. |
| 2014/0161268 A1 | 6/2014 | Antani et al. |

(Continued)

FOREIGN PATENT DOCUMENTS

WO    WO-2015103024 A1    7/2015

OTHER PUBLICATIONS

Jean-Marc Jot, Analysis and Synthesis of Room Reverberation Based on a Statistical Time-Frequency Model (Year: 1997).*

(Continued)

*Primary Examiner* — Norman Yu
(74) *Attorney, Agent, or Firm* — Harrington & Smith

(57) ABSTRACT

A method and apparatus for simulating reverberation in rendering systems. A decoder/renderer may determine how to simulate reverberation with reference to audio scene description format file information or other bitstream information regarding the virtual scene geometry, and/or a lookup table. Late reverberation may be generated based on reverberator parameters derived from the virtual scene geometry, including the lengths of delay lines, attenuation filter coefficients, and diffuse-to-direct ratio characteristics, using a feedback delay network. Early reverberation may be generated based on determining what potential reflecting elements in a virtual scene geometry are reflecting planes; this may involve the simulation of ray reflection, potentially through beam tracing.

20 Claims, 15 Drawing Sheets

(56) References Cited

U.S. PATENT DOCUMENTS

2016/0337779 A1* 11/2016 Davidson ............... H04S 7/306

OTHER PUBLICATIONS

Marrakech, Morocco, MPEG-1 Audio Architecture and Requirements, (Year: 2019).*

Thomas Funkhouser et al. "A Beam Tracing Approach to Acoustic Modeling for Interactive Virtual Environments" Mar. 2000.

Hequn Bai et al. "Geometric-Based Reverberator Using Acoustic Rendering Networks" 2015 IEEE Workshop on Applications of Signal Processing to Audio and Acoustics. Oct. 18-21, 2015, New Paltz, NY.

MPEG-I Audio Architecture and Requirements. International Organisation for Standardisation. ISO/IEC JTC1/SC29/WG11 MPEG2019/N18158; Jan. 18, 2019.

MPEG-I 6DoF Audio Encoder Input Format. International Organisation for Standardisation. ISO/IEC JTC/1/SC29/WG11 N18979; Jan. 17, 2020.

Philip Coleman et al. "Object-Based Reverberation for Spatial Audio" Journal of the Audio Engineering Society vol. 65, No. ½ Jan./Feb. 2017.

Riitta Vaananen et al. Advanced AudioBIFS: Virtual Acoustics Modeling in MPEG-4 Scene Description IEEE Transaction on Multimedia, vol. 6, No. 5, Oct. 2004.

Juha Merimaa et al. "Spatial Impulse Response Rendering I: Analysis and Synthesis" Laboratory of Acoustics and Audio Signal Processing, Helsinki University of Technology, FI-02015 TKK, Finland, Jan./Feb. 2006.

Vesa Valimaki et al. "Fifty Years of Artificial Reverberation" IEEE Transactions on Audio, Speech, and Language Processing, vol. 20, No. 5, Jul. 2012.

Vesa Valimaki et al. "More Than 50 Years of Artificial Reverberation" Aalto University School of Electrical Engineering AES $60^{th}$ Int. Conf. Leuven, Belgium Feb. 3, 2016.

Vesa Valimaki et al. "Late Reverberation Synthesis Using Filtered Velvet Noise" Applied Sciences. May 2017.

Matti Karjalainen et al. "More About This Reverberation Science: Perceptually Good Late Reverberation" Audio Engineering Society Convention Paper 5415. Presented at the $111^{th}$ Convention Sep. 21-24, 2001, New York, USA.

Lauri Savioja et al. "Creating Interactive Virtual Acoustic Environments" Journal of the Audio Engineering Society. Audio Engineering Society. Sep. 1999.

EVERTims "Open Source Framework for Real-Time Auralization in Architectural Acoustics and Virtual Reality" https://evertims.github.io/.

Hans Anderson et al. "Modeling the Proportion of Early and Late Energy in Two-Stage Reverberators" Journal of the Audio Engineering Society vol. 65, No. 12, Dec. 2017.

Fritz Menzer et al. "Binaural Reverberation Using a Modified Jot Reverberator with Frequency-Dependent Interaural Coherence Matching" Audio Engineering Society Convention Paper. Presented at the $126^{th}$ Convention May 7-10, 2009, Munich, Germany.

Benoit Alary et al. "Directional Feedback Delay Network" J. Audio Eng. Soc. vol. 67, No. 10, pp. 752-762, (Oct. 2019).

David Rocchesso "Maximally Diffusive Yet Efficient Feedback Delay Networks for Artificial Reverberation" IEEE Signal Processing Letters, vol. 4, No. 9, Sep. 1997.

Karolina Prawda et al. "Improved Reverberation Time Control for Feedback Delay Networks" Proceedings of the $22^{nd}$ International Conference on Digital Audio Effects (DAFx-19), Birmingham, UK, Sep. 2-6, 2019.

Juho Liski et al. "Converting Series Biquad Filters Into Delayed Parallel Form: Application to Graphic Equalizers" IEEE Transactions on Signal Processing, vol. 67, No. 14, Jul. 15, 2019.

Christian Schorkhuber "Binaural Rendering of Ambisonic Signals via Magnitude Least Squares" Institute of Electronic Music and Acoustics, University of Music and Performing Arts, Graz. May 11, 2018.

* cited by examiner

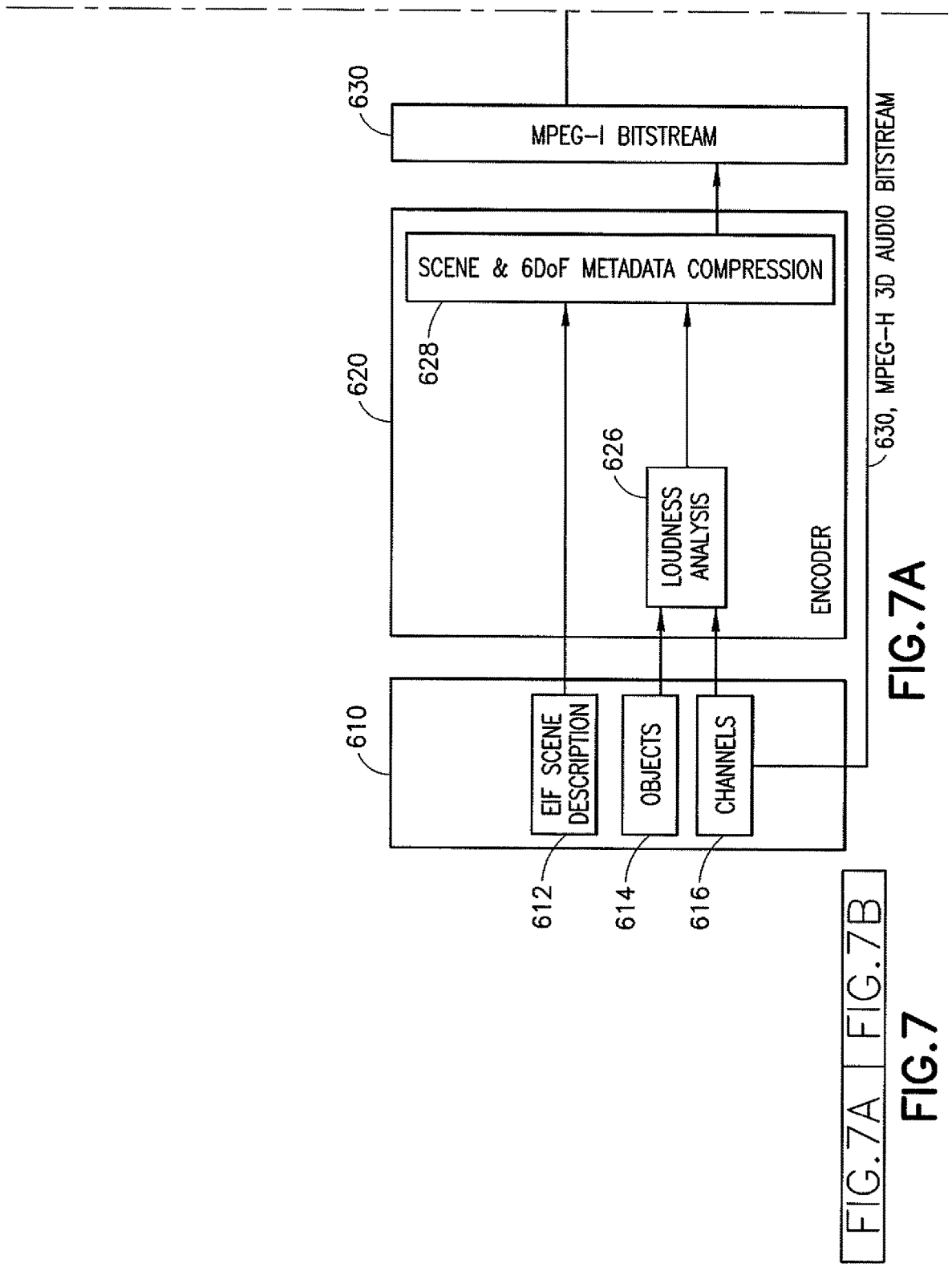

ENCODING REVERBERATOR PARAMETERS FROM VIRTUAL OR PHYSICAL SCENE GEOMETRY AND DESIRED REVERBERATION CHARACTERISTICS AND RENDERING USING THESE

CROSS-REFERENCE TO RELATED APPLICATIONS

This application claims the benefit of U.S. Provisional Application No. 62/990,092, filed on Mar. 16, 2020, which is hereby incorporated by reference in its entirety.

BACKGROUND

Technical Field

The example and non-limiting embodiments relate generally to immersive audio coding and specifically to synthesis of reverberation in spatial audio rendering systems.

Brief Description of Prior Developments

It is known, in 3D audio coding systems, to use fixed binaural room impulse response (BRIR) filters to render perceptually plausible, non-parametric reverberation for a single listening position.

BRIEF DESCRIPTION OF THE DRAWINGS

The foregoing aspects and other features are explained in the following description, taken in connection with the accompanying drawings, wherein:

FIG. 7, comprising FIGS. 7A and 7B, is a block diagram of one possible and non-limiting exemplary system in which the exemplary embodiments may be practiced;

DETAILED DESCRIPTION OF EMBODIMENTS

Figure 1:
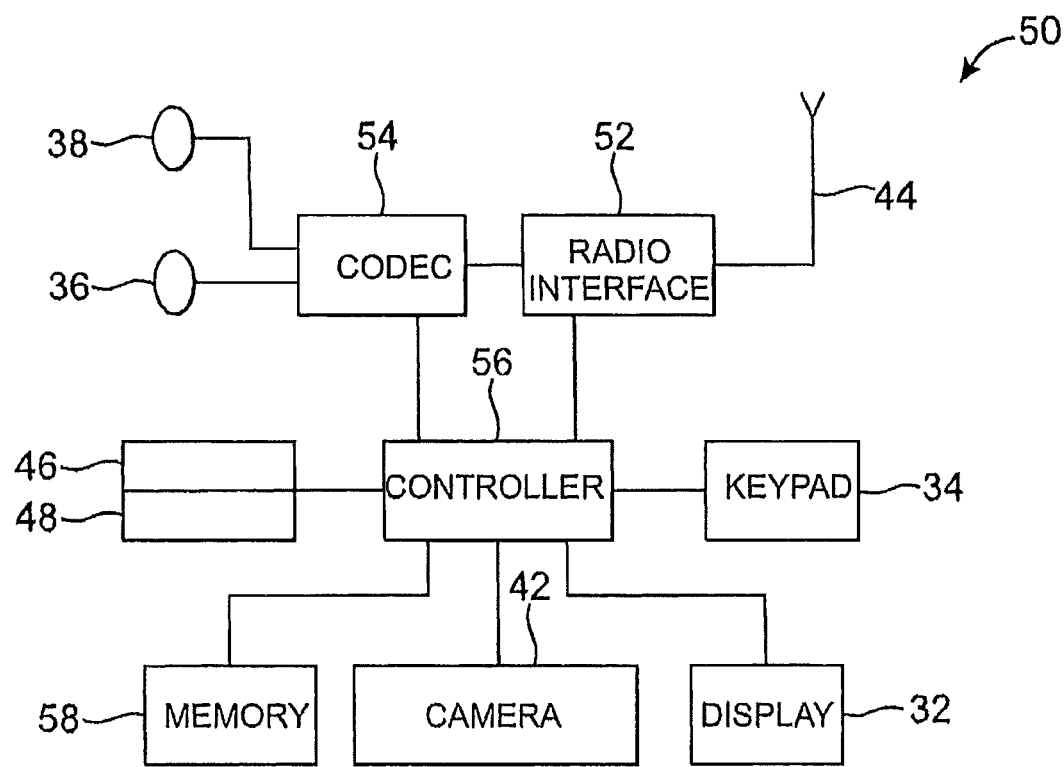
FIG. 1 is a block diagram of one possible and non-limiting exemplary system in which the exemplary embodiments may be practiced.

The following abbreviations that may be found in the specification and/or the drawing figures are defined as follows:
3GPP third generation partnership project
4G fourth generation
5G fifth generation
6DoF six degrees of freedom
AR augmented reality
BRIR binaural room impulse response
BSP binary-space-partitioning tree
CDMA code division multiple access
DDR diffuse-to-direct ratio
EIF encoder input format
EQ equalizer
ERB equivalent rectangular bandwidth
FIR finite impulse response
FDMA frequency division multiple access
FDN feedback delay network
GSM global system for mobile communication
HMD head mounted display
HOA higher-order ambisonics
HRTF head related transfer function
IIR infinite impulse response
IMD integrated messaging device
IMS instant messaging service
IoT Internet-of-Things
IVAS immersive voice and audio services
LTE long term evolution
LUT lookup table
MHAS MPEG-H audio stream
MME mobility management entity
MMS multimedia messaging service
MPEG Moving Picture Experts Group
MPEG-I Moving Picture Experts Group—ISO/IEC 23090 Coded Representation of Immersive Media
NR new radio
PDA personal digital assistant
SMS short message service
TCP-IP transmission control protocol-internet protocol
TDMA time division multiple access
UICC universal integrated circuit card
UMTS universal mobile telecommunications service
USB universal serial bus
VBAP vector-base amplitude panning
VR virtual reality
WLAN wireless local area network Features as described herein generally relate to simulation of reverberation in rendering systems. An audio scene may be a captured or virtual audio scene, and may be rendered in an augmented reality (AR) or virtual reality (VR) scenario. Virtual reality (VR) is an area of technology in which video content may be provided, e.g. streamed, to a VR display system. The VR display system may be provided with a live or stored feed from a video content source, the feed representing a VR space or world for immersive output through the display system. In some embodiments, audio is provided, which may be spatial audio. A virtual space or virtual world is any computer-generated version of a space, for example a captured real-world space, in which a user can be immersed through a display system such as a VR headset. A VR headset may be configured to provide VR video and audio content to the user, e.g. through the use of a pair of video screens and headphones incorporated within the headset. Augmented reality (AR) is similar to VR in that video content may be provided, as above, which may be overlaid over or combined with aspects of a real-world environment in which the AR content is being consumed. A user of AR content may therefore experience a version of the real-world environment that is "augmented" with additional virtual features, such as virtual visual and/or audio objects. A device may provide AR video and audio content overlaid over a visible/see-through or recorded version of the real-world visual and audio elements.

Simulation of reverberation within the audio scene may enable greater immersion of a listener in the audio scene. Features as described herein may relate to methods of encoding, decoding, and/or rendering the audio scene to enable reverberation simulation. The encoding, decoding, and/or rendering of the audio scene may take place at a single device or at two or more separate devices. For example, the encoding of the audio scene may take place at a user equipment, a server, or another electronic device capable of performing the processes herein described. The encoded audio scene may then be transmitted to another device, which may then store, decode, and/or render the audio scene. Transmission of the encoded audio scene may, for example, occur over a network connection, such as an LTE, 5G, and/or NR network. As another example, the encoding of the audio scene may take place at a server. The encoded audio scene may then be stored on a suitable file server, which may then be transmitted to another device, which may then store, decode, and/or render the audio scene.

The following describes in further detail suitable apparatus and possible mechanisms for simulation of reverberation in rendering systems according to example embodiments. In this regard reference is first made to FIGS. 1, which shows an example block diagram of an apparatus 50. The apparatus may be configured to perform various functions such as, for example, gathering information by one or more sensors, receiving or transmitting information, analyzing information gathered or received by the apparatus, or the like. A device configured to encode the audio scene may comprise one or more microphones for capturing an audio scene and/or one or more sensors for capturing information about the physical environment in which an audio scene is captured. Alternatively, a device configured to encode the audio scene may be configured to receive information about an environment in which an audio scene is captured and/or is to be simulated. A device configured to decode and/or render the audio scene may be configured to receive a Moving Picture Experts Group immersive audio standard (MPEG-I) bitstream comprising the encoded audio scene. A device configured to decode and/or render the audio scene may comprise one or more speakers/audio transducers and/or may be configured to transmit a decoded audio scene or audio signals to a device comprising one or more speakers/audio transducers. A device configured to decode and/or render the audio scene may comprise a user equipment, a head mounted display, or another device capable of rendering to a user an AR and/or VR experience.

The electronic device 50 may for example be a mobile terminal or user equipment of a wireless communication system. Alternatively, the electronic device may be a computer or part of a computer that is not mobile. It would be appreciated that embodiments of the present disclosure may be implemented within any electronic device or apparatus which may process data. The electronic device 50 may comprise a device that can access a network and/or cloud through a wired or wireless connection. The electronic device 50 may comprise one or more processors, one or more memories, and one or more transceivers interconnected through one or more buses. Each of the one or more transceivers includes a receiver and a transmitter. The one or more buses may be address, data, and/or control buses, and may include any interconnection mechanism, such as a series of lines on a motherboard or integrated circuit, fiber optics or other optical communication equipment, and the like. The one or more transceivers may be connected to one or more antennas. The one or more memories may include computer program code. The one or more memories and the computer program code may be configured to, with the one or more processors, cause the electronic device 50 to perform one or more of the operations as described herein.

The electronic device 50 may connect to a node of a network. The network node may comprise one or more processors, one or more memories, and one or more transceivers interconnected through one or more buses. Each of the one or more transceivers includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers may be connected to one or more antennas. The one or more memories may include computer program code. The one or more memories and the computer program code may be configured to, with the one or more processors, cause the network node to perform one or more of the operations as described herein.

The electronic device 50 may comprise a microphone 36 or any suitable audio input which may be a digital or analogue signal input. The electronic device 50 may further comprise an audio output device 38 which in embodiments of the present disclosure may be any one of: an earpiece, speaker, or an analogue audio or digital audio output connection. The electronic device 50 may also comprise a battery (or in other embodiments the device may be powered by any suitable mobile energy device such as solar cell, fuel cell or clockwork generator). The electronic device 50 may further comprise a camera 42 capable of recording or capturing images and/or video. The electronic device 50 may further comprise an infrared port for short range line of sight communication to other devices. In other embodiments the apparatus 50 may further comprise any suitable short-range communication solution such as, for example, a Bluetooth wireless connection or a USB/firewire wired connection.

The apparatus 50 may further comprise a display 32, which may be in the form of a liquid crystal display of any display technology suitable to display an image or video. The apparatus 50 may further comprise a keypad 34 or any suitable data or user interface mechanism may be employed for receiving user input. For example, a user interface may be implemented as a virtual keyboard or data entry system as part of a touch-sensitive display.

It should be understood that an electronic device 50 configured to perform example embodiments of the present disclosure may have fewer and/or additional components, which may correspond to what processes the electronic device 50 is configured to perform. For example, an apparatus configured to encode the audio scene might not comprise a speaker or audio transducer and may comprise a microphone, while an apparatus configured to render the decoded audio scene might not comprise a microphone and may comprise a speaker or audio transducer.

Referring now to FIG. 1, the electronic device 50 may comprise a controller 56, processor or processor circuitry for controlling the apparatus 50. The controller 56 may be connected to memory 58 which in embodiments of the present disclosure may store both data in the form of image and/or audio data and/or may also store instructions for implementation on the controller 56. The controller 56 may further be connected to codec circuitry 54 suitable for carrying out coding and/or decoding of audio and/or video data or assisting in coding and/or decoding carried out by the controller.

The electronic device 50 may further comprise a card reader 48 and a smart card 46, for example a universal integrated circuit card (UICC) and UICC reader for providing user information and being suitable for providing authentication information for authentication and authorization of the user at a network.

The electronic device 50 may comprise radio interface circuitry 52 connected to the controller 56 and suitable for generating wireless communication signals, for example for communication with a cellular communications network, a wireless communications system and/or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The electronic device 50 may comprise a microphone and/or other sensors (36) capable of recording or detecting audio signals and/or information about the real/local/virtual environment, which are then passed to the codec 54 or the controller 56 for processing. The electronic device 50 may receive the audio signals and/or information about the real/local/virtual environment for processing from another device prior to transmission and/or storage. The electronic device 50 may also receive either wirelessly or by a wired connection the audio signals and/or information about the local/virtual environment for coding/decoding. The structural elements of electronic device 50 described above represent examples of means for performing a corresponding function.

The memory 58 may be of any type suitable to the local technical environment and may be implemented using any suitable data storage technology, such as semiconductor-based memory devices, flash memory, magnetic memory devices and systems, optical memory devices and systems, fixed memory and removable memory. The memory 58 may be a non-transitory memory. The memory 58 may be means for performing storage functions. The controller 56 may be or comprise one or more processors, which may be of any type suitable to the local technical environment, and may include one or more of general-purpose computers, special purpose computers, microprocessors, digital signal processors (DSPs) and/or processors based on a multi-core processor architecture, as non-limiting examples. The controller 56 may be means for performing functions.

Figure 2:
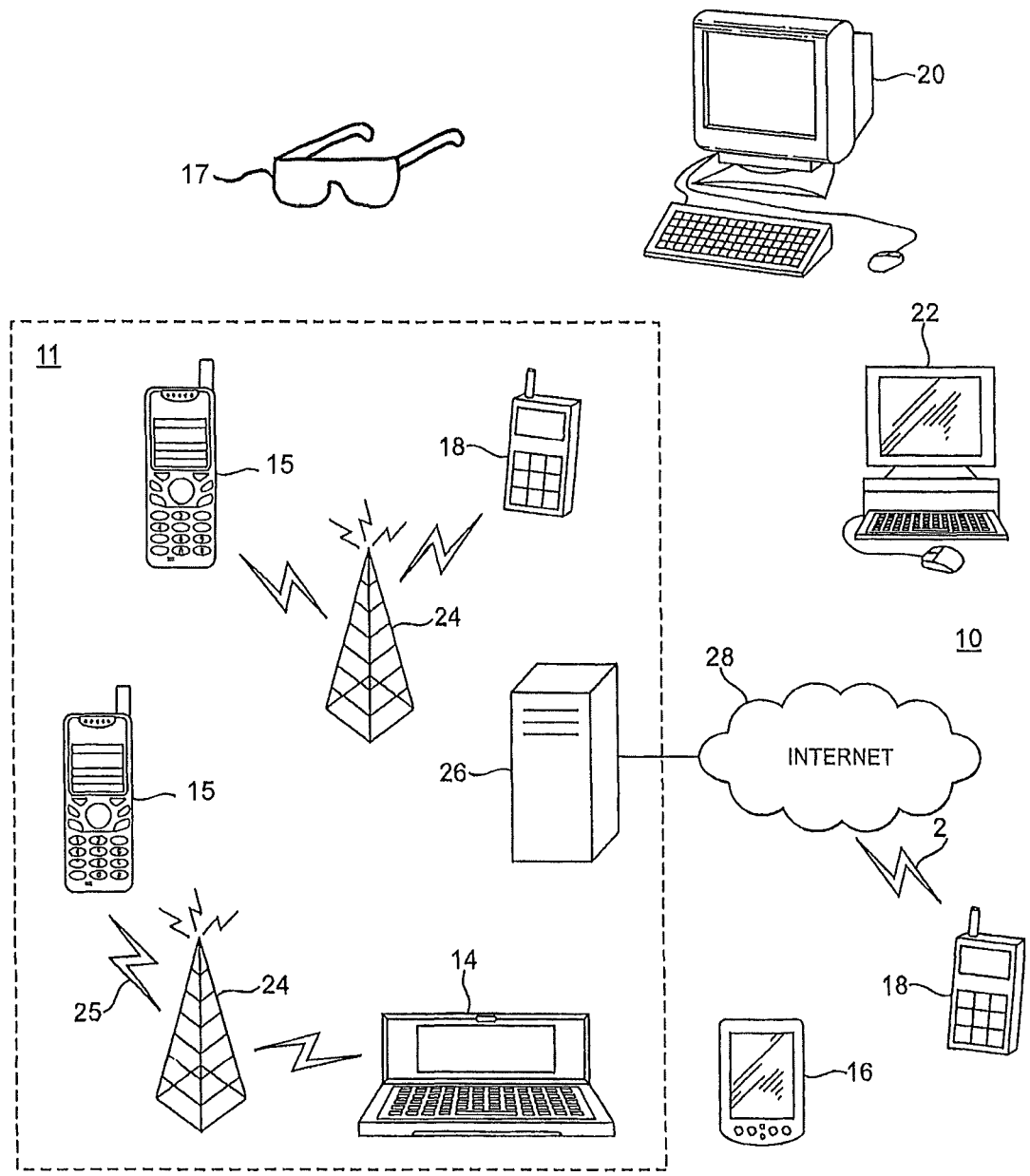
FIG. 2 is a diagram illustrating features as described herein.

With respect to FIG. 2, an example of a system within which embodiments of the present disclosure may be utilized is shown. The system 10 comprises multiple communication devices which can communicate through one or more networks. The system 10 may comprise any combination of wired or wireless networks including, but not limited to, a wireless cellular telephone network (such as a GSM, UMTS, CDMA, 4G, 5G network etc.), a wireless local area network (WLAN) such as defined by any of the IEEE 802.x standards, a Bluetooth personal area network, an Ethernet local area network, a token ring local area network, a wide area network, and/or the Internet.

The system 10 may include both wired and wireless communication devices and/or electronic devices suitable for implementing embodiments of the present disclosure.

For example, the system shown in FIG. 2 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an apparatus 15, a combination of a personal digital assistant (PDA) and a mobile telephone 14, a PDA 16, an integrated messaging device (IMD) 18, a desktop computer 20, a notebook computer 22, a head-mounted display (HMD) 17, etc. The electronic device 50 may comprise any of those example communication devices. In an example embodiment of the present disclosure, more than one of these devices, or a plurality of one or more of these devices, may perform the disclosed process(es).

The embodiments may also be implemented in a set-top box; i.e. a digital TV receiver, which may/may not have a display or wireless capabilities, in tablets or (laptop) personal computers (PC), which have hardware and/or software to process neural network data, in various operating systems, and/or in chipsets, processors, DSPs and/or embedded systems offering hardware/software based coding. The embodiments may also be implemented in cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and/or communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and/or any similar wireless communication technology. A communications device involved in implementing various embodiments of the present disclosure may communicate using various media including, but not limited to, radio, infrared, laser, cable connections, and/or any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, which may be a MPEG-I bitstream, from one or several senders (or transmitters) to one or several receivers.

Figure 3:
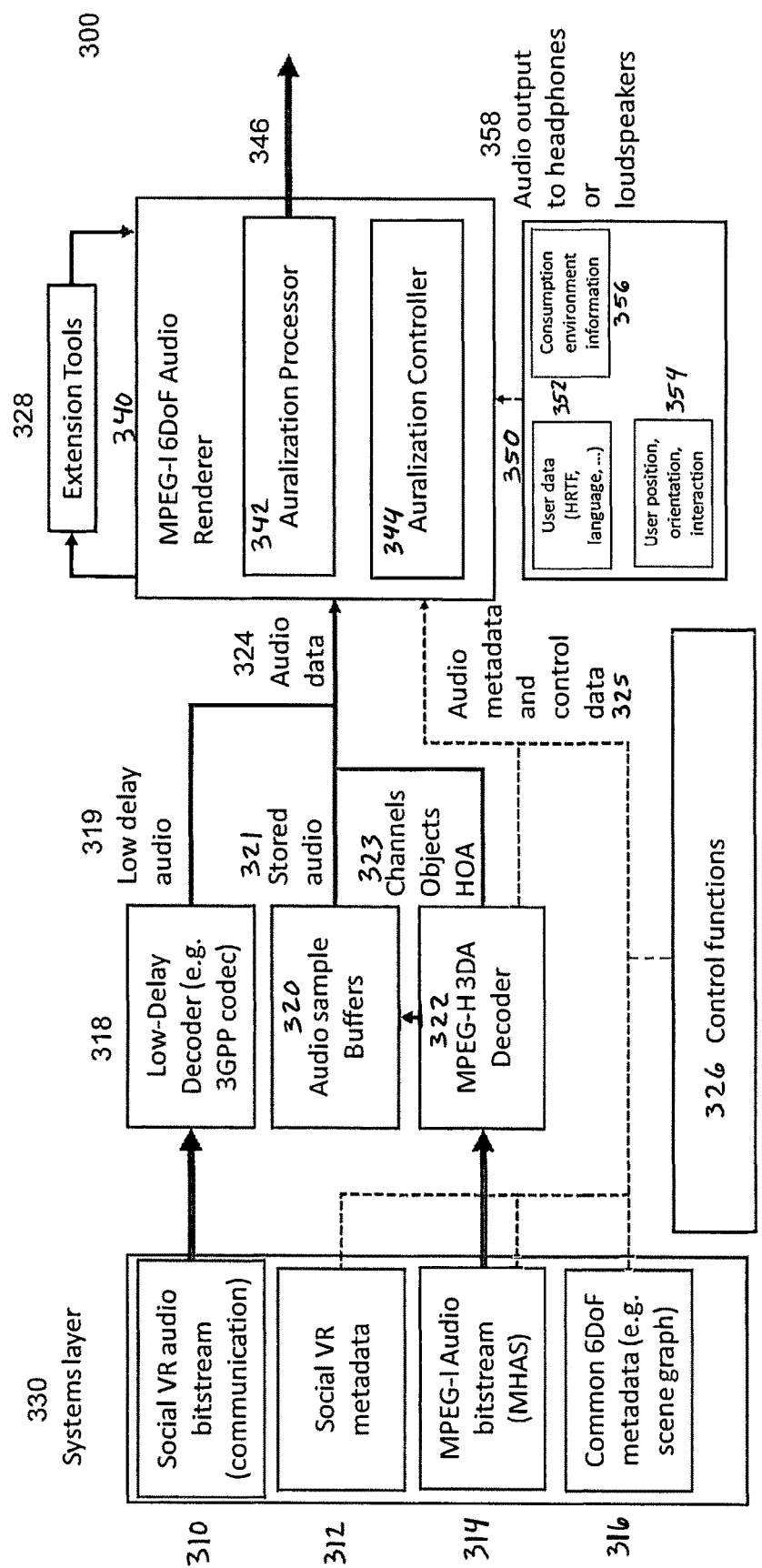
FIG. 3 is a block diagram of one possible and non-limiting exemplary system in which the exemplary embodiments may be practiced.

Features as described herein generally relate to simulation of reverberation in rendering systems. Rendering may, for example, be MPEG-I Audio Phase 2 (6DoF) or MPEG Immersive Audio (MIA) rendering and may take place in MPEG-I architecture as described in ISO/IEC JTC1/SC29/WG11 MPEG2019/N18158. Referring now to FIG. 3, illustrated is a high-level example of an MPEG-I audio system 300, which may be configured to perform example embodiments of the present disclosure. The MPEG-I audio system 300 may comprise systems layer 330, which may comprise social VR audio bitstream (communication), 310; social VR metadata, 312; MPEG-I audio bitstream (e.g., as MHAS), 314; and/or common 6DoF metadata (e.g. scene graph), 316. The social VR bitstream 310 may be decoded with low-delay decoder 318, which may, for example, be a 3GPP codec, to produce low delay audio 319. The MPEG-I audio bitstream 314 may be decoded with MPEG-H 3DA decoder 322, which may output channels, objects, and/or higher-order ambisonics (HOA), 323 and may be added to audio sample buffers 320. Audio data 324 may comprise the low delay audio 319, stored data 321 from the audio sample buffers 320, and/or channels, objects, and/or HOA 323. Audio data 324 may be transmitted to an MPEG-I 6DoF audio renderer 340. The audio renderer 340 may optionally receive audio metadata and/or control data 325 from social VR metadata layer 312, MPEG-I audio bitstream 314, and/or common 6DoF metadata 316 from systems layer 330, and/or from control functions 326. The audio renderer 340 may optionally receive 350 user data, such as HRTF, language, etc., 352; user position, orientation, and/or interaction information, 354; and/or consumption environment information 356. The audio renderer 340 may optionally receive control functions 326 (which may describe a run-time API) which may at least partially control the rendering functionality of audio renderer 340. The audio renderer 340 may make use of extension tools 328. The audio renderer 340 may comprise one or more auralization processors 342 and one or more auralization controllers 344. The output 346 of the audio renderer 340 may comprise audio output to headphones or loudspeakers 358. The decoding and/or rendering illustrated in FIG. 3 may be performed using one or more electronic devices 50 as described above.

Figure 4:
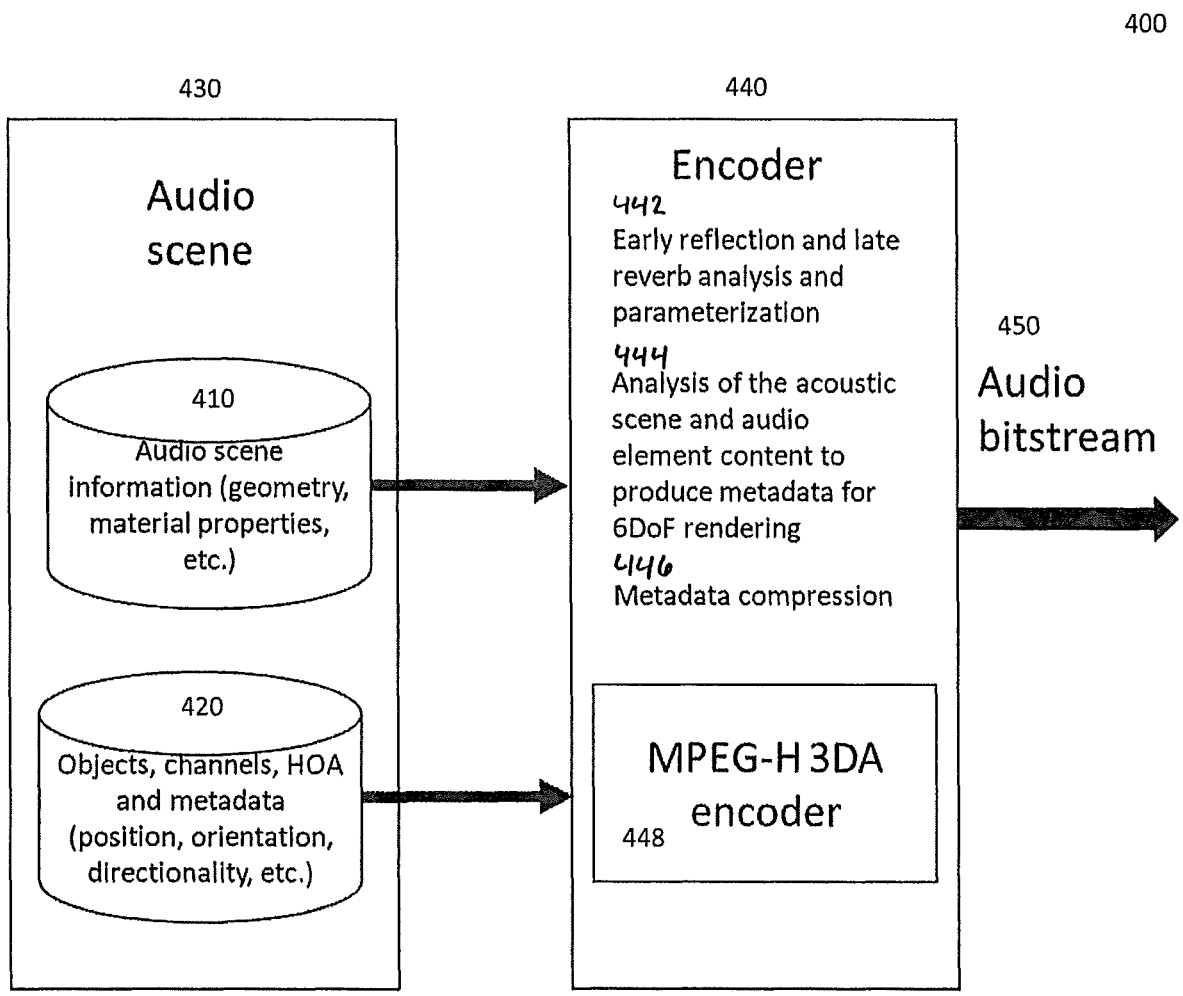
FIG. 4 is a block diagram of one possible and non-limiting exemplary system in which the exemplary embodiments may be practiced.

Referring now to FIG. 4, illustrated is a high-level example of an MPEG-I encoder 400, which may be configured to perform example embodiments of the present disclosure. The audio scene 430 may comprise audio scene information 410 and audio information 420. The audio scene information 410 may comprise geometry, material properties, and/or other information related to the environment in which audio signals were captured or are to be experienced during rendering. The audio information 420 may comprise objects, channels, HOA, and/or metadata, which may include metadata related to position, orientation, directionality, etc. related to the objects, channels, and/or HOA. The audio scene information 410 and the audio information 420, which may include audio signals and associated metadata (position, orientation, extent, directionality, etc.), may be encoded with encoder 440. The objects, channels, and HOA of the audio information 420 may be encoded with MPEG-H 3DA encoder 448. In addition, such metadata in audio information which is compatible with MPEG-H 3D audio may, in an example embodiment, be encoded with a MPEG-H 3D audio encoder. The rest of the metadata in audio information may, in an example embodiment, be encoded with other encoding mechanisms designed for 6DoF audio in MPEG-I Audio Phase 2 in the encoder 440. The encoder 440 may evaluate the audio scene information 410: early reflection and late reverberation analysis and parameterization may occur, 442; analysis of the acoustic scene and audio element content to produce metadata for 6DoF rendering may occur, 444; and metadata compression may occur, 446. The encoded audio scene information 410 and the encoded audio information 420 may be transmitted in an audio bitstream 450. The audio bitstream 450 may be decoded and rendered, and/or it may be stored.

Features as described herein may relate to MPEG-I Immersive Audio standard (MPEG-I Audio Phase 2 6DoF) rendering. MPEG-I will support audio rendering for virtual reality (VR) and augmented reality (AR) applications. The standard will be based on MPEG-H 3D Audio, which supports 3DoF rendering of object, channel, and HOA content. In 3DoF rendering, the listener is able to listen to the audio scene at a single location while rotating their head in three dimensions (yaw, pitch, roll) and the rendering stays consistent to the user head rotation. That is, the audio scene does not rotate along with the user head but stays fixed as the user rotates his head. The additional degrees of freedom in 6DoF audio rendering may enable the listener to move in the audio scene along the three cartesian dimensions x, y, and z. The newly developed MPEG-I standard aims to enable this by using MPEG-H 3D Audio as the audio signal transport format while defining new metadata and rendering technology to facilitate 6DoF rendering. FIGS. 3 and 4 illustrate an example MPEG-I encoding, transmission, and rendering architecture.

6DoF audio scenes in MPEG-I Audio Phase 2 may comprise audio elements such as objects, channels, and/or HOA, and scene description, which may be in terms of the room/scene dimensions, geometry, and/or materials. Metadata parameters, such as source directivity and size for audio objects, may also be included for MPEG-I 6DoF audio scenes. The MPEG-I Audio Phase 2 encoder, which may be according to FIG. 4, may encode the audio scene parameters into a bitstream and may send or transmit the encoded audio scene parameters, together with the audio signals (which may take the form of audio elements of the audio scene), to the decoder and/or renderer, which may be according to FIG. 3. The renderer may then create or derive head-tracked binaural audio output or loudspeaker output for rendering the scenes in 6DoF using the audio elements and the produced metadata, along with the current listener position.

Modeling and rendering of reverberation in virtual acoustic scenes may be undertaken in MPEG-I Audio Phase 2. In the predecessor MPEG-H 3D, such modeling and rendering of reverberation was not necessary, as the listener was not able to move in the space; fixed binaural room impulse response (BRIR) filters were sufficient for rendering perceptually plausible, non-parametric reverberation for a single listening position. See, for example, WO2015/103024 A1, designing optimal binaural room impulse response (BRIR) filters to be used in headphone virtualizers. However, in MPEG-I 6DoF audio, the listener will have the ability to move in a virtual space. Accordingly, a key aspect in a high-quality immersive listening experience, whether AR or VR, may comprise determining the way in which early reflections and late reverberation change in different parts of the space as the listener moves in the virtual space. In addition, content creators or users may provide acoustic scenes, which may require methods for parameterizing the reverberation parameters of an arbitrary virtual space in a perceptually plausible way for those provided acoustic scenes.

Reverberation refers to the persistence of sound in a space after the actual sound source has stopped. Different spaces are characterized by different reverberation characteristics. For conveying a spatial impression of an environment, reproducing reverberation in a perceptually plausible manner may be important.

Figure 5:
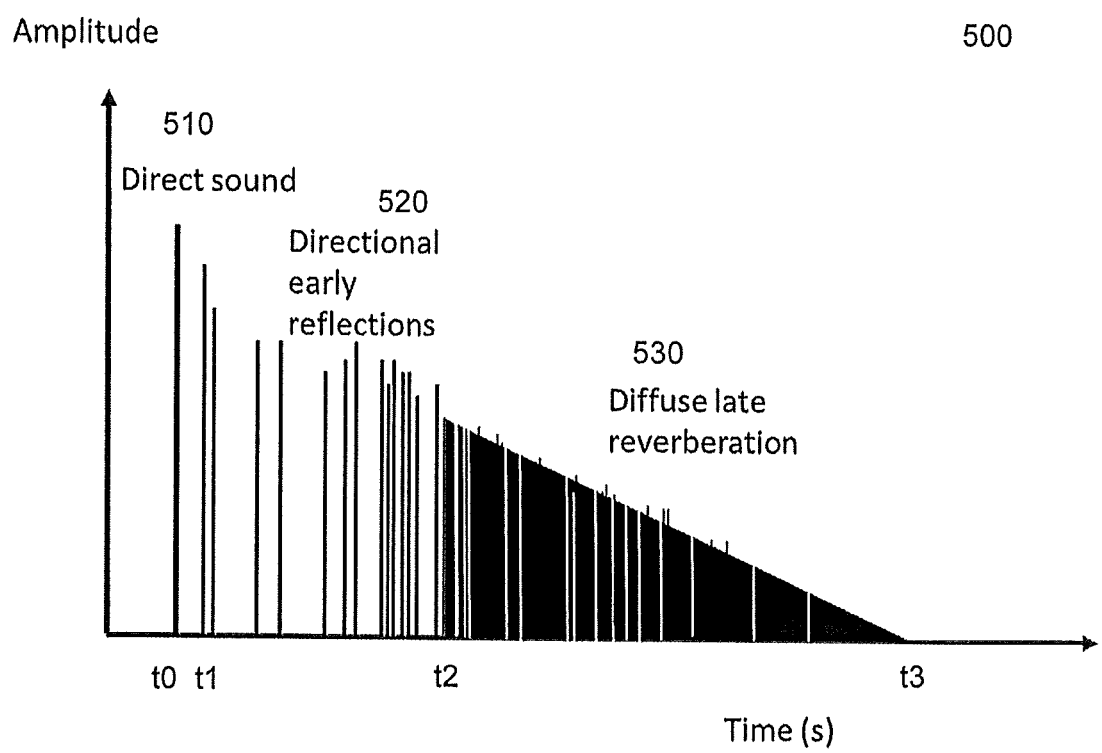
FIG. 5 is a model illustrating features as described herein.

Referring now to FIG. 5, illustrated is a simplified model of a room impulse response 500 which characterizes the reflections and reverberation in an example space. It should be understood that this model illustrates the impulse response of a specific room, and that other rooms/spaces/environments with different impulse responses are possible. The illustrated room impulse response 500 comprises a direct sound 510 with a high amplitude at time t0; directional early reflections 520 between, approximately, times t1 and t2; and diffuse late reverberation 530 between, approximately, times t2 and t3. After the direct sound 510, the listener may hear directional early reflections 520. After some point, i.e. t2, individual reflections 520 might no longer be perceived but the listener may hear diffuse, late reverberation 530. In FIG. 5, wideband reverberation decay is depicted; a common characteristic of normal physical spaces is that the rate of decay is frequency dependent. In an example embodiment, directional early reflections and diffuse late reverberations may be modeled and/or derived for simulation of reverberation in rendering systems.

Methods of simulating reverberation may include: using delay networks to simulate the reverberation, using delay lines, filters, and feedback connections; using convolution algorithms to apply convolution to a dry input signal using a captured or simulated room impulse response (RIR); using computational acoustics to simulate the propagation of sound and its reflections in a given geometry using, for example, ray tracing methods; using virtual analog models to simulate tapes, plates, or springs, i.e. devices which were formerly used for producing reverberation effects. See, e.g., V. Välimäki, J. D. Parker, L. Savioja, J. O. Smith, and J. S. Abel, "Fifty years of artificial reverberation," IEEE Trans. Audio, Speech, and Language Processing, vol. 20, no. 5, pp. 1421-1448, July 2012; V. Välimäki, J. D. Parker, L. Savioja, J. O. Smith, and J. S. Abel, "More than 50 years of artificial reverberation," Audio Eng. Soc. 60th Int. Conf. DREAMS (Dereverberation and Reverberation of Audio, Music, and Speech), At Leuven, Belgium, 2016. Reverberation may be simulated through convolution with a velvet noise. See Välimäki, Holm-Rasmussen, Alary, Lehtonen, Late reverberation synthesis using filtered velvet noise, Appl. Sci. 2017, 7, 483; doi:10.3390/app7050483. Early reflections may be synthesized using the image source model and late diffuse reverberation may be synthesized with a digital reverberator. See Creating interactive virtual acoustic environments, Savioja, Huopaniemi, Lokki, Vaananen, J. Audio Eng. Soc., Vol. 47, No. 9, 1999 September Early reflections may be obtained with an efficient beam tracing algorithm and may be encoded into ambisonics and then decoded into the desired output (binaural or loudspeakers). The obtained early reflections may also be fed into an FDN reverberator which generates the diffuse late part of the reverberation. See EVERTims https://evertims.github.io/. Reverberation may be modeled using a two-stage model. See Modeling the Proportion of Early and Late Energy in Two-Stage Reverberators, Journal of the Audio Engineering Society Vol. 65, No. 12, December 2017 (C 2017) DOI: https://doi.org/10.17743/jaes.2017.0041.

Example embodiments may involve methods for parameterizing and rendering audio scenes comprising audio elements, such as objects, channels, and/or higher-order ambisonics (HOA), and audio scene information, which may include geometry, dimensions, and/or materials, in order to simulate reverberation. Example embodiments may also involve the inclusion of metadata which enable conveying the artistic intent, that is, how the rendering should be controlled and/or modified as the user moves in the scene.

Features as described herein may relate to simulation of reverberation in rendering systems. Simulation of reverberation may be used in rendering of object audio and, more generally, in rendering any acoustically dry sources to enhance the perceived quality of reproduction. More accurate simulation may be useful in interactive applications, such as AR/VR applications, where virtual sound sources (i.e., audio objects) and the listener may move in an immersive virtual space. For true plausibility of the virtual scene, plausible reverberation simulation may be useful.

Simulation of reverberation may be achieved in various ways. A suitable approach may be to simulate the direct path, early reflections, and late reverberation separately, or substantially separately, based on an acoustic description of a virtual scene.

Figure 6:
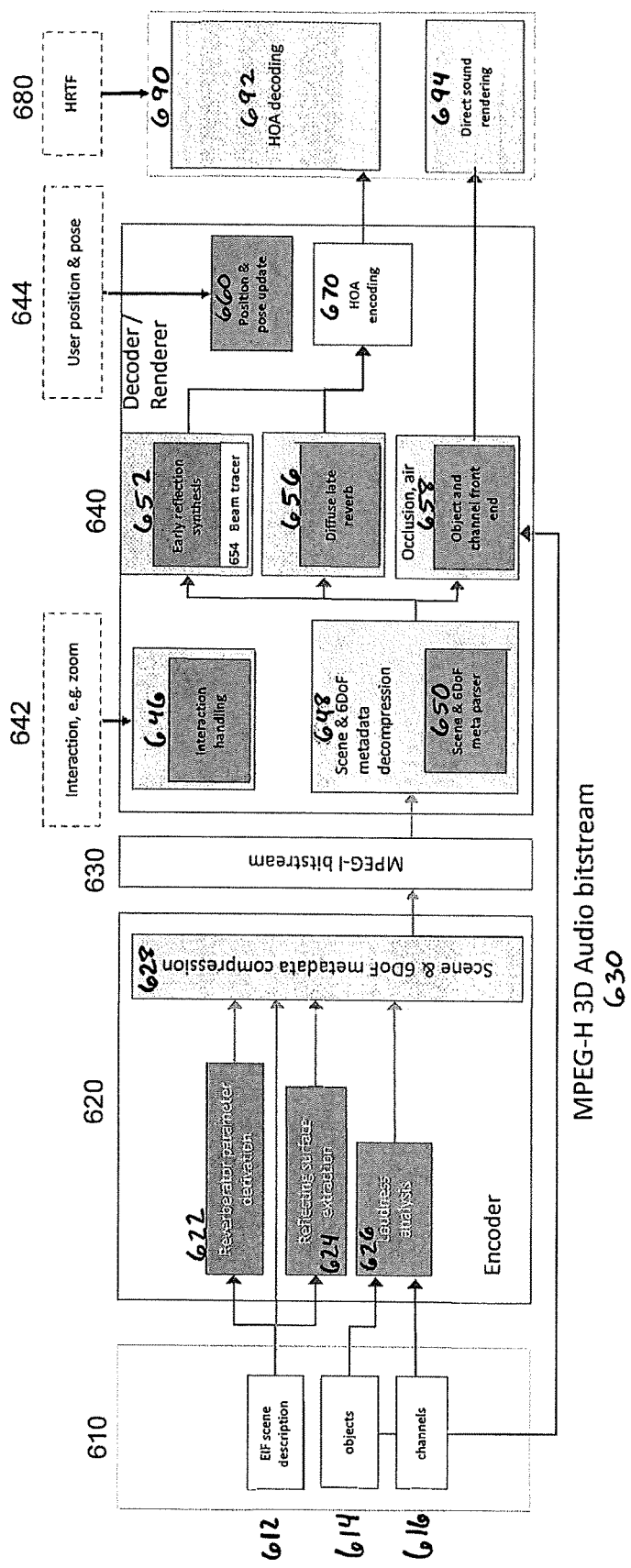
FIG. 6 is a block diagram of one possible and non-limiting exemplary system in which the exemplary embodiments may be practiced.

Input to an MPEG-I Audio Phase 2 encoder, which may be according to FIGS. 4, 6, and/or 7, may be a file describing the virtual acoustic scene, including the scene geometry and/or materials. In addition, there may be included in the file parameters describing the desired reverberation characteristics, such as RT60 times for each of certain frequencies, as further discussed below. If RT60 data is not provided, then RT60 data may need to be applied via acoustic simulation using the scene geometry and its acoustic materials. A simple acoustic simulation may comprise using closed form RT60 approximation equations. More complex acoustic simulation may comprise using geometric acoustic or wave acoustic techniques or their combinations.

An MPEG-I Audio Phase 2 decoder, which may be according to FIGS. 3, 6, and/or 7, may be configured to extract the parameters needed for high quality virtual acoustic rendering of reverberation from such a scene description or file, and a renderer, which may be according to FIGS. 3, 6, and/or 7, may be configured to render the reverberation using these parameters.

Features as described herein may relate to immersive audio coding and specifically to synthesis of reverberation in spatial audio rendering systems. Example embodiments may be directed to a six degrees of freedom (6DoF) use case and may be applied to the rendering part of immersive audio codecs such as MPEG-I and 3GPP IVAS (immersive voice and audio services), which are targeted for VR and AR applications.

In an example embodiment, a method for extracting reverberation rendering parameters from a virtual audio scene description and for rendering reverberation using the extracted reverberation rendering parameters may be provided. Additionally or alternatively, the method may be used for extracting reverberation parameters for a real listening space or a combination of a real listening space as well as a virtual audio scene. At least one reflection parameter may be extracted from the audio scene description and may be signaled/transmitted/indicated to the renderer to be used for rendering early reflections. This may occur during encoding or during decoding of the audio scene. Attenuation filter coefficients and delay line lengths for a feedback-delay-network (FDN) reverberator may be extracted/determined/optimized based on reverberation characteristics defined in the virtual scene description; these may be considered reverberator parameters. This may occur during encoding or during decoding (i.e. in an AR implementation) of the audio scene. Reverberation for dry object signals may be rendered by direct synthesis of early reflections using the extracted reflection parameter(s), and diffuse late reverberation with the FDN reverberator using the optimized FDN parameters.

In this disclosure, the term "reflecting parameter" or "reflection parameter" may be used interchangeably. Generally, a reflection parameter may be a parameter associated at least to a portion of a physical or virtual scene and describes an element of the physical or virtual scene which is relevant for early reflection rendering or a characteristic of one or more early reflections associated with a portion of the physical or virtual scene. A reflection parameter may, for example, comprise a reflecting surface. A reflecting surface may be planar or not/non planar (having an arbitrary shape which may be represented analytically e.g. as a box, cylinder, via meshes, etc.). Additionally or alternatively, a reflection parameter may be a parameter configured to characterize one or more sound reflections. For example, a reflection parameter may be one or more of a position, a delay, a level, a direction of arrival, and/or another parameter suitable to represent characteristics of early reflection(s) related to a certain source/listener position, or positions of image sources, which may be used for deriving parameters of early reflections related to a certain source/listener position.

In this disclosure, the terms "reverberator parameter" and "FDN parameter" may be used interchangeably.

In an example embodiment which may be directed to AR rendering, the reflection parameter(s) and reverberator parameters may be obtained from physical room information. This may occur during decoding/rendering. The physical room information may contain or comprise information on reflection parameter(s) in the environment of the renderer and/or desired/measured reverberation characteristics.

In an example embodiment which may be directed to VR rendering, the reverberator parameters and/or reflection parameter(s) may be obtained based on an audio scene description format that may be used to perform early reflections and reverberation modeling (e.g. an encoder input format (EIF) definition), which may either contain reflection parameter(s) defined and indicated by a content creator or user, or determined by algorithms which process the scene geometry and derive relevant reflection parameter(s) automatically. Reverberator parameters may be optimized by algorithms based on reverberation characteristics included in the audio scene description format so that desired reverberation may be reproduced.

In an example embodiment, user input may affect the definition of the reverberator parameters and/or reflection parameter (s). For example, the reverberator parameters and/or reflection parameter(s) may be obtained as a result of an encoding process comprising automated/algorithmic steps as well as manual steps performed by a content creator or user. For example, the encoding process may be iterative such that a first algorithmic step may produce an initial set of parameters which may then be utilized in a renderer to render reverberation for the content creator or user. The content creator or user may then listen to the output and adjust the parameters until a desired reverberation rendering quality is obtained. In an alternative example embodiment, a user may input values for reverberator parameters/reflection parameter(s) and/or tune the content of existing values for these parameters/plane(s) with respect to the encoder and/or decoder/renderer. In any of these example embodiments, there may be an aspect of human involvement in the determination of reverberator parameters, reflection parameter(s), and/or desired reverberation of the rendering. While FIGS. 6 and 7 do not illustrate a production pipeline including human involvement, a person of ordinary skill in the art would understand that steps related to derivation of reverberator parameters, extraction of reflecting surfaces, synthesis of early reflection(s), synthesis of diffuse late reverberation, and/or rendering of the sound scene may be further based on user input.

In an example embodiment which may be directed to AR rendering, the physical room information may be provided to the renderer directly such that no encoder-side optimization is possible/necessary. Instead, reverberator parameters may be obtained from a lookup table which may associate reverberation parameters with room dimensions and/or materials. Reverberator parameters may alternatively be obtained with any means which is suitable for being executed in the renderer device. An example includes using computationally efficient optimization means for deriving the attenuation filter parameters for an FDN reverberator. An example includes using neural networks for accelerating the optimization of graphic EQ attenuation filter gains. Room geometry information may be obtained from the AR rendering device and may contain a definition including room dimensions, simple geometry, and/or an indication of significant reflection parameters of the rendering environment, which may, for example, comprise reflection surfaces.

In an example, to obtain the room geometry information, the AR rendering device may contain, comprise, or be in communication with various sensors such as distance/depth/infrared/ultrasound sensor(s), camera(s) and/or other sensors which may facilitate scanning of the environment around the device, i.e. the environment in which AR content may be consumed. The AR rendering device may contain or comprise processing algorithm(s) for determining surfaces or planes from, or based on, the surrounding geometry scans, i.e. information about the surrounding environment. In some embodiments, the AR rendering device may utilize network processing to assist in determining the room geometry information from the sensory readings. For example, an edge server connected in a 5G network to the AR rendering device may receive the sensory readings of the device and execute processing algorithms to determine necessary room geometry information and/or reverberation parameters, and signal these back to the AR rendering device which may provide these to the renderer, where they may be used for audio rendering.

In an example, the AR rendering device may provide point-cloud data, based on omnidirectional visual capture, ultrasound or other suitable sensors, and communicate this over the 5G link to an edge server. The edge server may convert the point-cloud to meshes and execute mesh-simplification algorithms to determine a simplified geometry, from which reflection parameters (e.g. reflection surfaces) may then be determined using one or more of the example methods presented in this disclosure. The AR rendering device may indicate the desired number of reflecting surfaces to the network processing entity/edge server and accordingly receive a response which matches the computational complexity criteria provided by or associated with the AR rendering device. That is, depending on the computational capacity available on the rendering device, the edge server may determine a suitable number of reflecting elements which the AR rendering device may utilize for rendering early reflections. The more computing capacity is available on the rendering device, the more reflecting elements it may be enabled to utilize for real time audio rendering without audible glitches in the sound.

Alternatively, the network entity, which may be an edge server, may communicate a scalable representation of reflecting elements to the AR rendering device, and the rendering device may pick/select a subset of the scalable representation of reflecting elements which matches its computational capacity. For example, a scalable representation of reflecting elements may be constructed such that a first level of reflecting elements corresponds to the coarse structure of the scene geometry, and following levels of reflecting elements gradually increase the level of detail in the scene. Each level in the scalable representation of reflecting elements may be associated with a cumulative number of reflecting elements up to that level, and the AR rendering device may make a selection based on the cumulative number of reflecting elements and its own computational capacity.

It should be noted that, in an example embodiment directed to a VR rendering, a similar process for scanning an environment and determining parameters using edge cloud processing may be utilized at or prior to the encoding of the audio scene. For example, where the audio scene is based on audio captured in a real world environment, a device comprising one or more sensors as described above may be used to capture information about the geometry of the environment, and edge cloud processing may be used to determine parameters for describing the audio scene that may be encoded.

Referring now to FIG. 6, illustrated is an example system 600 for encoding, decoding, and rendering an audio scene according to example embodiments of the present disclosure, specifically with regard to VR audio rendering. The system 600 may include encoder side processing, which may include capture/creation and/or analysis of an audio scene 610 and encoding 620 of the audio scene; transmission of the encoded audio scene with a bitstream 630, which may include bitstream transport of objects, channels, reflecting surfaces, and/or reverberation parameters; and decoding/rendering of the encoded audio scene 640, 690, which may be according to the obtained reverberation parameters and the encoded audio scene. A person of ordinary skill would understand that these portions of the system 600 may be performed with a single electronic device 50 or with multiple electronic devices 50 performing the functions of one or more portions of the system 600.

In an example embodiment, reverberated signals may be created in an interactive immersive audio rendering system based on virtual or physical scene geometry and desired reverberation characteristics. Referring now to FIG. 6, at 610, one or more audio scene description format (e.g. EIF) files may be created or configured to comprise scene description, 612. The audio scene description format scene description may be used, at encoder 620, to derive one or more reverberator parameters 622 and/or extract one or more reflecting surfaces 624. Deriving the one or more reverberator parameters 622 may comprise obtaining attenuation filter coefficients, delay line lengths, and/or diffuse-to-direct ratio filter coefficients based on the desired reverberation characteristics, which may be included in the audio scene description format scene description 612 (e.g. EIF scene description). Extracting the one or more reflecting/reflection parameters 624 may comprise obtaining a reflecting parameter associated with a virtual or physical scene geometry, which may be included in the EIF scene description 612. The EIF scene description 612 may also include information about the positions and properties/characteristics of audio elements/objects in the audio scene, and/or RT60 time(s), which may be included on a per frequency basis. It should be noted that an encoder 620 may optionally take as input information that is not in the form of an audio scene description format file. For example, a data stream or other suitable input format may be used to provide information to the encoder 620, which may be used at 622 to derive reverberator parameter(s) and/or at 624 to extract reflecting surface(s).

The audio scene may comprise one or more objects 614 and/or one or more channels 616. These objects or channels may have been captured in a real-world environment or may have been defined as part of a virtual environment to be rendered with the system 600. The one or more objects 614 and/or one or more channels 616 may be used to obtain one or more dry audio element signals, i.e. object and channel front end 658 at decoder/renderer 640. The one or more objects 614 and/or one or more channels 616 may be used in loudness analysis 626 at encoder 620. The one or more objects 614 and/or one or more channels 616 may be transmitted or sent from encoder 620 to decoder/renderer 640 via MPEG-H 3D audio bitstream 630.

The derived reverberator parameter(s) 622, extracted reflecting surface(s) 624, dry audio element signals 614 and/or 616, EIF scene description 612, and/or the output of the loudness analysis 626 may be compressed 628 at the encoder 620 in a scene & 6DoF metadata compression step, along with the scene and its parameters such as audio object positions, their directivities, etc. The output of the compression 628 may be transported with one or both of a MPEG-I/MPEG-H 3D bitstream 630 for storage and/or decoding/rendering. Although FIG. 6 depicts separate MPEG-I bitstream 630 and MPEG-H 3D Audio bitstream 630, they can be combined into a single bitstream by multiplexing, packetization, interleaving or by other mechanism well known in the art.

The decoder/renderer 640 may decompress the scene and 6DoF metadata 648. The scene and 6DoF metadata may be parsed at 650. The output of the decompression and/or parsing may be used in subsequent steps 652, 656, and/or 658. Using obtained reflecting parameter(s) and the dry audio element signal, at least one early reflection may be synthesized 652. This process may optionally comprise the use of beam tracing 654. The attenuation filter coefficients, delay line length, and diffuse-to-direct ratio filter coefficients (i.e. reverberator parameters derived at 622) may be used, for example in a digital reverberator, to produce a diffuse reverberated signal, 656. The encoder/decoder 640 may combine the early reflection(s) and the diffuse reverberated signal to produce a reverberated signal of the dry audio element signal. The combination may be done by summing or by HOA encoding 670. Alternatively, the early reflection signal(s) and the diffuse reverberated signal(s) may be panned to virtual loudspeaker signals using VBAP or other suitable panning method(s). The effect of occlusion/air may be determined at 658 and may be used to modify object and channel front end to enable direct sound rendering 694.

The decoder/renderer 640 may optionally also comprise an interaction handling module 646, which may optionally take as input an interaction 642 such as, for example, zoom. The decoder/renderer 640 may optionally also comprise a position and pose update module 660, which may optionally take as input a user position and pose 644, which may be the result of user tracking. User tracking may be tracking of the location and/or orientation of the user/listener as they move through the listening environment. A person of ordinary skill in the art would understand the methods by which a user/ listener may be tracked, including the use of Bluetooth, HAIP, image sensors, inertial sensors, etc. These methods of tracking may be appropriate where the user is wearing an HMD or is using a device or system capable of user tracking within an environment. However, the example embodiments of the present disclosure are not limited to use with an HMD or such a device/system; the example embodiments may also be practiced with an electronic device without tracking capability. A person of ordinary skill in the art would also understand that, instead of user tracking, the user may himself input his position and/or orientation in the virtual world by means of a joystick, keyboard, game controller, trackpad or other suitable currently known or not yet conceived mechanism.

Output from these modules 646 and 660 may affect the HOA encoding 670 and/or the object and channel front end 658, and ultimately perception of the rendered audio scene.

At 690, the encoded HOA may be decoded for rendering 692, and the direct sound may be rendered 694. Rendering may optionally be affected with the use of head related transfer function(s) 680, which may be chosen based on desired spatial position (azimuth and elevation) for direct sound rendering. For HOA to binaural decoding, one method may be to synthesize virtual loudspeakers to the positions of available HRTFs. Another may be direct synthesis of HOA to binaural which can be done, for example, via the magnitude least squares method presented in Schörkhuber, Zaunschirm, Höldrich, "Binaural Rendering of Ambisonic Signals via Magnitude Least Squares," in Proc. DAGA 2018 Munich. The HRTFs may be built into the system or they may be provided by the user.

Figure 7B:
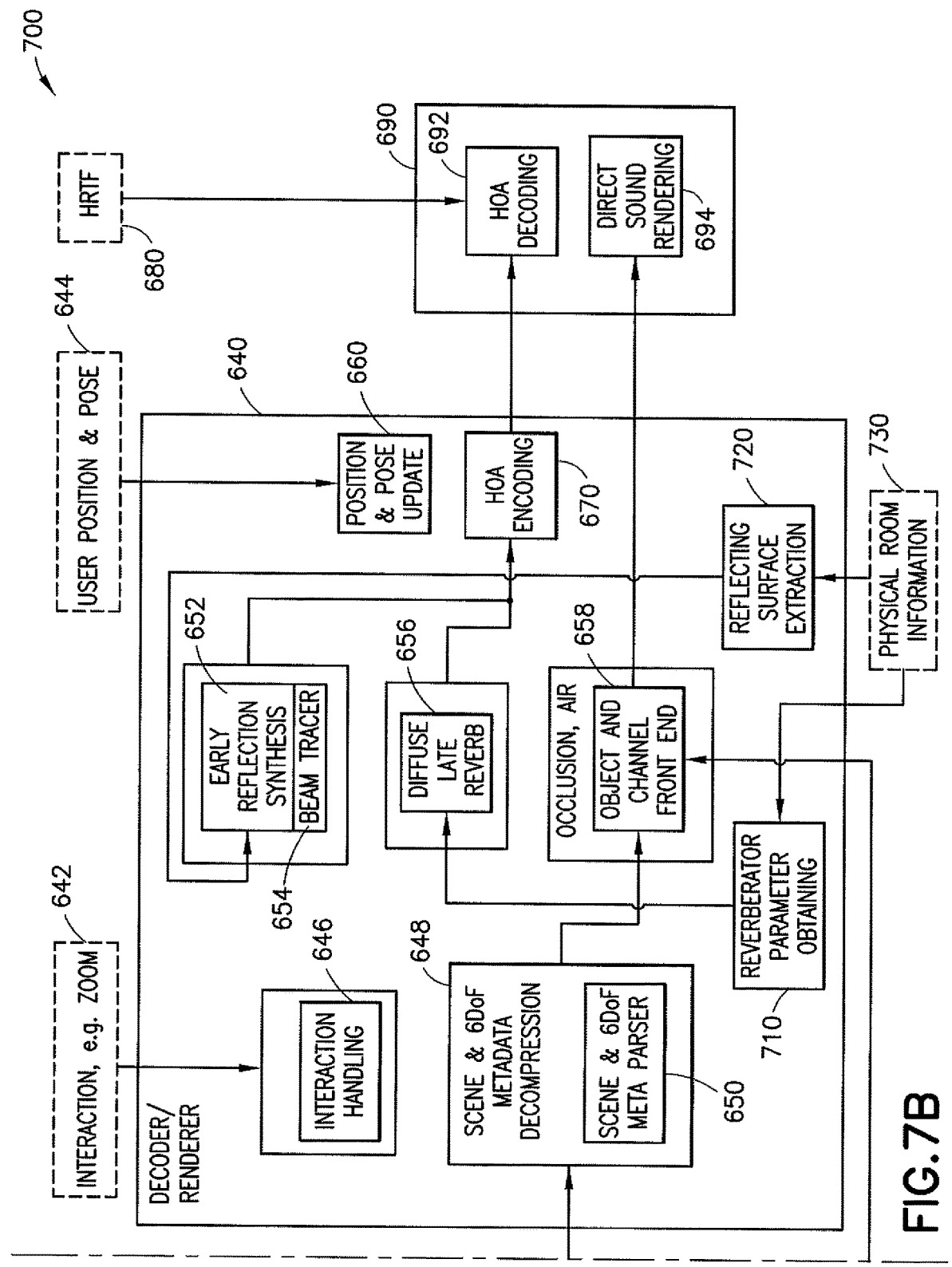

Referring now to FIG. 7, comprising FIGS. 7A and 7B, illustrated is an example system 700 for encoding, decoding, and rendering an audio scene according to example embodiments of the present disclosure, specifically with regard to AR audio rendering. The system 700 may include encoder side processing, which may include capture/creation and/or analysis of an audio scene 610 and encoding 620 of the audio scene; transmission of the encoded audio scene with a bitstream 630, which may include bitstream transport of parameters related to the audio scene such as objects, channels, object positions, orientations and directivities, and their spatial extent; and decoding/rendering of the encoded audio scene 640, 690, which may be according to obtained reverberation parameters based on physical room information 730 and the encoded audio scene. A person of ordinary skill would understand that these portions of the system 600 may be performed with a single electronic device 50 or with multiple electronic devices 50 performing one or more portions of the system 700. Similar elements of FIG. 7 are denoted with the corresponding labels used in FIG. 6, and duplicative description has been omitted. It should be noted that while FIG. 6 depicts a system directed to VR rendering and FIG. 7 depicts a system directed to AR rendering, these systems may be combined within a single system capable of handling both VR and AR rendering. A person of ordinary skill in the art would understand how the functionality of FIGS. 6 and 7 may be combined. The different elements of FIG. 7 will now be described.

In an AR scenario, as described above, the physical room information may be provided to the renderer directly such that no encoder-side optimization is possible/necessary. The audio scene description format description 612 (e.g. EIF description) may be compressed 628 and transmitted via the MPEG-I Audio Phase 2 bitstream 630, as in FIG. 6. However, the EIF description 612 may in some cases comprise little information about major scene geometries; instead, the geometry of the real-world environment in which AR content is consumed may be of greater interest for synthesizing early reflection(s) and diffuse late reverberation. However, the EIF description 612 may contain other information, such as audio element/object positions and properties, as in FIG. 6. Accordingly, at the decoder/renderer 640, i.e. the renderer side, reverberator parameters may be obtained 710 and reflecting surfaces may be extracted 720, optionally based on the physical room information 730, rather than or in addition to being based on EIF scene description 612. The obtained reverberator parameters 610, which may include attenuation filter coefficients, delay line length, and/or diffuse-to-direct ratio filter coefficients, may be used, for example in a digital reverberator, to produce a diffuse reverberated signal, 656. The extracted reflecting surface(s) 720 may be used to synthesize at least one early reflection 652.

Figure 8:
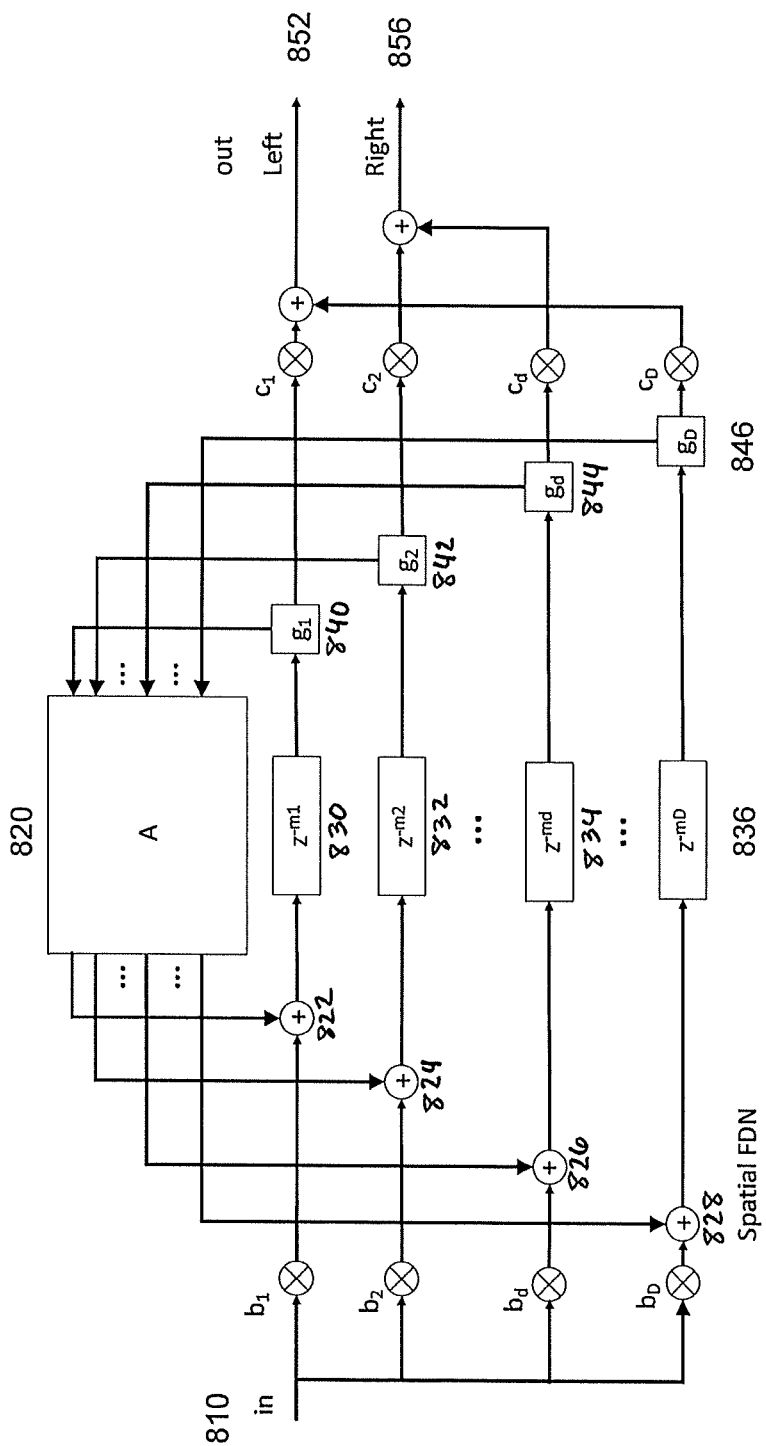
FIG. 8 is a block diagram of one possible and non-limiting exemplary system in which the exemplary embodiments may be practiced.

In an example embodiment, production of a diffuse reverberated signal, as at 656 in FIGS. 6 and 7, may be performed using a feedback delay network (FDN). Referring now to FIG. 8, illustrated is a FDN late reverberation generator 800 for rendering the diffuse late reverberation. The FDN 800 may take as input 810 a dry input signal and output a left output signal 852 and a right output signal 856 after processing based on one or more reverberator parameters, which may include attenuation filter coefficient(s), delay line length(s), and/or diffuse-to-direct ratio filter coefficient(s). In addition, the FDN 800 input parameters may include feedback matrix coefficients A, input gain coefficients b1 through bD, and/or output gain coefficients c1 through cD. Some or all of these input parameters may be signaled in the bitstream 630 from the encoder 620. Additionally or alternatively, some or all of these input parameters may be stored already in the renderer and not signaled. In an example embodiment, the values for delay line lengths (i.e. 830, 832, 834, 836), attenuation filter coefficients (i.e. 840, 842, 844, 846), and diffuse-to-direct ratio coefficients (not illustrated) may be determined in the encoder 620 and signaled to the renderer 640 via bitstream 630, whereas the rest of the input parameters, such as, for example, the feedback matrix coefficients A, may be stored on the renderer 640 and not signaled via bitstream 630. The foregoing sources for input parameters for FDN 800 are not limiting; different variations of the previous are possible. The FDN 800 may process the input 810 using D delay lines. The FDN 800 may use attenuation filter coefficients $g_i \ldots g_D$ (i.e. 840, 842, 844, 846) feedback matrix coefficients A (820, applied at i.e. 822, 824, 826, 828), and lengths mi (at i.e. 830, 832, 834, 836) for the D delay lines. Note that in FIG. 8, mi denotes the delay line length, while $z^{-mi}$ denotes a delay of m samples. Note that in FIG. 8, the coefficients of the attenuation filters $g_i \ldots g_b$ may comprise vectors or matrices of coefficients.

The number of delay lines D may be adjusted depending on quality requirements and the desired tradeoff between reverberation quality and computational complexity. In an example embodiment, an efficient implementation with D=15 delay lines may be used. This may make it possible to define the feedback matrix coefficients, A (820), as proposed in Rochesso, Maximally Diffuse Yet Efficient Feedback Delay Networks for Artificial Reverberation, IEEE Signal Processing Letters, Vol. 4, No. 9, September 1997, in terms of a Galois sequence facilitating efficient implementation. The number of delay lines D may be sufficient to ensure a dense sequence of attenuating impulses are output with the FDN 800 (852, 856). If a denser output is desired, then the number of delay lines may be increased, but this increases the computational cost. In an example embodiment, the number of delay lines may be adjusted depending on the complexity of scene geometry. In particular, more delay lines may be selected the more complex the scene geometry is. This selection of a higher number of delay lines may be based on the observation that complex scene geometries may require more delay lines to increase the pulse density. This can be done, for example, by mapping the number of meshes (or other geometric elements such as reflecting surfaces or planes) in scene geometry to the number of delay lines. In an example, a straightforward scene geometry with four walls and roof and ceiling may be mapped to 15 delay lines, and more complex scene geometries may be mapped to increasing/higher amounts of delay lines. In another example embodiment, the number of delay lines may be adjusted depending on the size of the acoustic environment. For example, a relatively lower number of delay lines may be selected for a relatively small acoustic environment, while a relatively higher number of delay lines may be selected for a relatively large acoustic environment. In other words, a large number of delay lines may be used for a large space while the number of delay lines may be reduced for smaller spaces.

FIG. 8 does not depict diffuse-to-direct ratio filter coefficients, but the coefficients may be used/applied to input signal 810 prior to feeding the input signal 810 to the FDN 800, or alternatively, after the signal (852 and/or 856) is output from the FDN 800. In another example embodiment, the coefficients of the diffuse-to-direct ratio filter may be combined with the coefficients of the attenuation filters (840, 842, 844, 846) to create modified attenuation filters $g_i \ldots g_D$ which may contain both the effect of desired frequency dependent attenuation needed to implement the desired RT60 and the appropriate diffuse-to-direct ratio. Application of the diffuse-to-direct ratio filter coefficients may serve to control the amplitude of diffuse late reverberated sound output with FDN 800 (852 and/or 856). These reverberator parameters may be determined according to a method illustrated by FIG. 9.

Figure 9:
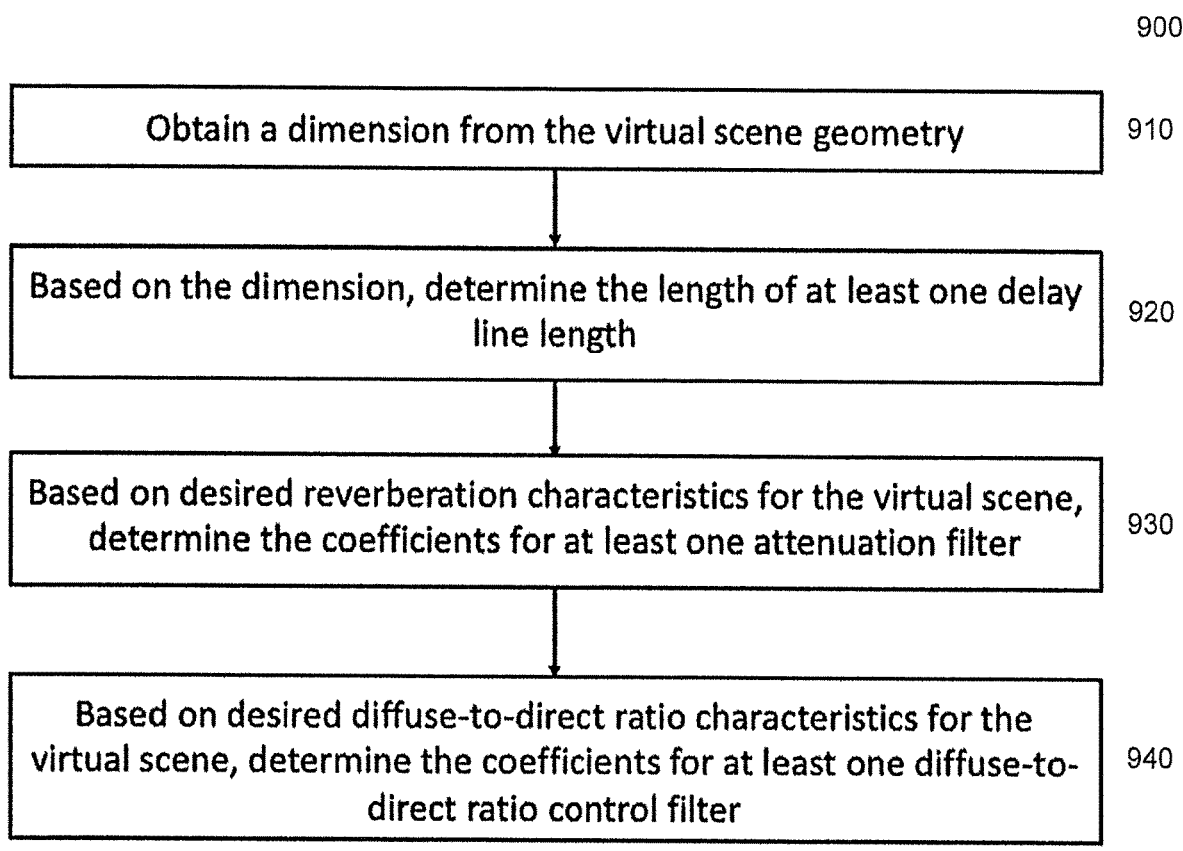
FIG. 9 is a flowchart illustrating steps as described herein.

Referring now to FIG. 9, illustrated are the potential steps of an example method 900. The example method 900 may include obtaining a dimension from the virtual scene geometry, 910. In a VR scenario, as depicted at FIG. 6, this may be performed at an encoder 620 during extraction of reflecting surfaces, 624. Alternatively, this information may be included in the audio scene description format scene description 612 (e.g. EIF scene description). In an AR scenario, as depicted at FIG. 7, this may be performed at a renderer side 640 during extraction of reflecting surfaces 720. Alternatively, this information may be included in the physical room information 730. In another example embodiment, the social VR/AR metadata 312 described in FIG. 3 may be used instead of, or in addition to, the physical room information 730 of FIG. 7 to obtain a dimension from the virtual scene geometry. This example embodiment may be used in a case where the social VR/AR metadata 312 provides/comprises acoustic information which is to be applied to the audio content in the social VR/AR audio bitstream 310. The main VR/AR content may be rendered with the reverberation and reflection parameters in the VR/AR bitstream (which may be derived based on the audio scene description format), but the social VR/AR conversation participant voice, or other content the social VR audio bitstream 310 and/or the low-delay decoder 318 output may comprise, can have different acoustic properties applied if the social VR/AR metadata 312 provides these parameters. This may make it possible, for example, to implement a relatively dry voice with little reverberation for the conversation participant, while the rest of the audio scene is rendered as normal, i.e. with its own acoustic properties.

It is also possible to signal the reverberation parameter(s) or the reflection parameter(s) in the Social VR/AR metadata 312 to be applied only to the Low delay audio 319 of FIG. 3. For example, if only reverberation parameters are signaled, and it is further signaled that the reflection parameter(s) from the main content bitstream (e.g. 314) may be used, then the early reflections for the Low delay audio 319 may be created based on the VR/AR scene information (e.g. 316) but the late reverberation may have different characteristics signaled in the Social VR/AR metadata 312. This may make it possible, for example, to have such spectral coloration and proximity effects in the Low delay audio 319 such that the conversation experience is immersive; when the Social VR/AR participant whose voice is in 319 Low delay audio is close to a wall in the virtual space, the early reflection rendering according to the VR/AR scene reflection parameters may modify his/her voice so that the wall proximity may be perceived. However, if reverberation parameters corresponding to a shorter RT60 time than in the VR/AR space have been signaled in the Social VR/AR metadata 312, then the conversation participant audio may still remain relatively dry, which may help improve speech intelligibility.

The example method 900 may include, based on the dimension, determining the length of at least one delay line, 920. In a VR scenario, as depicted at FIG. 6, this may be performed at an encoder 620 during derivation of reverberator parameters, 622. In an AR scenario, as depicted at FIG. 7, this may be performed at a renderer side 640 during obtaining of reverberator parameters, 710. The at least one delay line length may comprise length mi for delay line i of the D delay lines. As an example, length and (834) for a delay line d of the D delay lines may be determined based on a room dimension, such as a dimension obtained at 910. For example, a shoebox shaped room may be defined with dimensions xDim, yDim, zDim. The lengths of each delay line may be set according to standing wave resonance frequencies in the virtual room or physical room. The delay line lengths may further be made mutually prime. Additionally or alternatively, the delay line lengths may be based on the average mean free path of sound travel in the physical or virtual space, or may be otherwise related to the distance(s) between geometric elements in the space, between which reflection(s) and/or sound resonance(s) may occur.

The example method 900 may include, based on desired reverberation characteristics for the virtual scene, determining the coefficients for at least one attenuation filter, 930. In a VR scenario, as depicted at FIG. 6, this may be performed at an encoder 620 during derivation of reverberator parameters, 622. In an AR scenario, as depicted at FIG. 7, this may be performed at a renderer side 640 during obtaining of reverberator parameters, 710. The coefficients for the at least one attenuation filter may comprise a vector or matrix of coefficients for each attenuation filter $g_i$ of delay line i of the D delay lines. The attenuation filter coefficients (840, 842, 844, 846) in the delay lines may be adjusted so that a desired amount, in decibels, of attenuation happens/occurs/is caused at each signal recirculation through the delay line so that the desired RT60 time is obtained. RT60 refers to how long it would take a sound to decay by 60 dB in the room or environment. This adjustment of the attenuation filter coefficients may be done in a frequency-specific manner to ensure an appropriate rate of decay of signal energy at specified frequencies. Accordingly, in an embodiment a vector or matrix of coefficients for a given attenuation filter $g_i$ may comprise a coefficient for each specified frequency. In another embodiment, the coefficients for each attenuation filter $g_i$ of delay line i may comprise the feedforward and feedback coefficients and an overall gain of IIR (infinite impulse response) filters together implementing an equalizer filter bank, as described in further detail later. The audio scene description format file 612 (e.g. EIF file) may provide as input the desired RT60 time, per specified frequencies f, denoted as rt60(f). For a frequency f, the desired attenuation per signal sample may be calculated as attenuationPerSample(f)=−60/(samplingRate*rt60(f)). The attenuation in decibels for a delay line of length and may then be calculated as attenuationDb(f)=md*attenuationPerSample(f).

The example method 900 may include, based on desired diffuse-to-direct ratio characteristics for the virtual scene, determining the coefficients for at least one diffuse-to-direct ratio control filter, 940. In a VR scenario, as depicted at FIG. 6, this may be performed at an encoder 620 during derivation of reverberator parameters, 622. In an AR scenario, as depicted at FIG. 7, this may be performed at a renderer side 640 during obtaining of reverberator parameters, 710.

Referring now to FIG. 8, the attenuation filters (840, 842, 844, 846) may be designed, for example, as cascade or parallel graphic equalizer filters as proposed in Juho Liski, Balazs Bank, Julius O Smith, Vesa Valimaki, "Converting Series Biquad Filters into Delayed Parallel Form: Application to Graphic Equalizers", IEEE Trans. On Signal Proc. Vol 67, No. 14, pp. 3785-3795. The design procedure outlined in Liski takes as input a set of command gains at octave or third octave bands. In an example embodiment of the present disclosure, each frequency f may be mapped to the closest octave or third octave band and the filter coefficients (840, 842, 844, 846) may be optimized with the method proposed in Liski.

The coefficients for a parallel graphic equalizer $g_i$ acting as an attenuation filter (e.g. 840, 842, 844, 846) may contain the feedforward and feedback coefficients and an overall gain factor F, not illustrated in FIG. 8. For example, the coefficients may comprise the feedforward and feedback coefficients for 31 biquad IIR filters, so that there is a 2-by-31 matrix of feedforward coefficients B and a 3-by-31 matrix of feedback coefficients A. The feedback coefficients may be further condensed if the first coefficient always equals one; it may, in this case, be represented as a 2-by-31 matrix as well. If there are fewer than 31 bands, then the number of filters will be fewer. In an embodiment, each delay line may have its own coefficients for the IIR filter bank. Instead of the parameters of a parallel graphic equalizer, the parameters may be provided for a corresponding cascade graphic equalizer IIR filterbank.

In an example embodiment, the attenuation filter may be a combination filter, such as a cascade of a parallel graphic equalizer filter and at least one other filter, which may improve reproduction accuracy of the RT60 at some frequency region. In an example, the attenuation filter may comprise using a high shelf filter to improve the accuracy of modeling at high frequencies and/or using a low shelf filter to improve the modeling accuracy at low frequencies. If such a filter is used, then its coefficients may be determined in the encoder as well and signaled to the renderer.

If included, the diffuse-to-direct ratio filter may also be a graphic equalizer filter. The diffuse-to-direct ratio filter may be applied on the reverberator bus to which input signals to the diffuse reverberator are summed. The reverberator bus may comprise a bus into which different audio object signals (e.g. 614) are summed, which may serve as input 810 for FDN 800 after application of the diffuse-to-direct ratio filter as described above. The more negative the control gain of the diffuse-to-direct ratio filter at a certain frequency, the more that frequency may be dominated by direct sound. A diffuse-to-direct ratio DDR(f) may be provided in the audio scene description format file (e.g. EIF file). The diffuse-to-direct ratio DDR(f) may then be used to optimize the filter coefficients so that the control gain is zero when DDR(f)=1 and control gain is a large negative number (in decibels) when the DDR(f)=0. DDR values provided on a linear scale may be converted to decibels before application as target response for the GEQ filter coefficient optimization. Furthermore, the difference in decibels of the DDR values (in decibels) and the reverberator response (in decibels) may be taken/used as the target response of the GEQ coefficient optimization. Application of the diffuse-to-direct ratio filter may serve to control the amplitude of diffuse reverberation at specific frequencies as specified or described by DDR data. The diffuse-to-direct ratio characteristics may be provided as a frequency dependent target response, which may indicate the amount of diffuse sound energy at given frequencies. The DDR filter parameters may be adjusted so that when the reverberator is fed with a unit impulse, the reverberator output follows the target response provided in the diffuse-to-direct ratio characteristics. This may be done by first disabling the DDR filter and feeding the reverberator with a unit impulse and measuring the spectrum of the output reverberation. The DDR filter target response may then be taken as the difference between the target diffuse-to-direct ratio characteristics and the spectrum of the output reverberation without a DDR filter. The diffuse-to-direct ratio characteristics may also be provided as an impulse response. In this case, the amount of direct sound energy and diffuse sound energy may be determined from the provided impulse response, and the spectrum of the diffuse sound energy may be taken as the target response. The DDR filter parameters may be designed as described above.

Those skilled in the art will realize that graphical EQ filters are just one alternative for implementing the attenuation and DDR ratio control filters. Many other alternative filter structures exist, both using IIR (infinite impulse response) and/or FIR (finite impulse response) filters, and the realization of the filter calculations may be done in the time of frequency domain or sometimes even in the quefrency domain. Linear or logarithmic/warped/perceptually motivated frequency scales may be used for processing; examples include the Mel and equivalent rectangular bandwidth (ERB) scales.

In an AR scenario, reverberator parameters may be obtained as above, but the processing may be executed on the rendering device/at the decoding/rendering side rather than at the encoding side. Simplifications may be applied to the process, for example, computationally simpler methods may be used for the optimization of graphic EQ attenuation filter coefficients. Alternatively, in an AR scenario, the parameters may be obtained from a lookup table, in contrast to some of the description of FIG. 9 above. In an AR scenario, the attenuation filter coefficients and diffuse-to-direct ratio filter coefficients may need to be obtained on the renderer side, and may therefore need to be obtained quickly without iterative optimization procedures. Instead, a lookup table may be used. The lookup table may contain pre-computed attenuation filter coefficients for different shapes of the bandwise reverberation time curves. Searching from the lookup table (LUT) may comprise taking the desired frequency dependent RT60(f) as input and then matching that to the RT60(f) which may be realized by each of the filters in the table, and selecting the one giving the best match. Alternatively, the room dimensions and/or one or more of its acoustic materials may be the search keys into the lookup table. That is, for all filters the LUT lists the room dimensions and materials to which the filter corresponds to, and then at least one observed room dimension and/or material may be used as the search key.

The lookup table size may be designed based on the desired accuracy of RT60 reproduction. That is, the closer or more accurately we want to be able to reproduce the desired reverberation RT60(f), the closer we need to be able to model the frequency dependent shape of the attenuation in decibels attenuationDb(f) which the attenuation filter needs to realize. The lookup table may be designed by simulating different room geometries and material combinations and storing the attenuation filter coefficients, which may be optimized to reproduce the frequency dependent reverberation characteristics for those combinations. A set of second room geometries may then be simulated, and the closest attenuation filter may be selected for them. The maximum error in decibels at a certain frequency, or an average overall frequency, may then be used as the error criterion for accurate RT60 reproduction. This error may be calculated over all closest attenuation filters to obtain an average error score for this lookup table.

It is noted that different lookup tables may be designed based on the desired accuracy of matching. Generally, a larger lookup table will give a better match, at the expense of a larger memory footprint, whereas a smaller lookup table will give a coarser match, but with the benefit of a smaller memory footprint. It is also noted that different filter structures may be selected for different desired levels of accuracy in RT60 modeling. For example, a parallel graphic equalizer with ten bands may be used if coarser accuracy in RT60 modeling suffices, whereas 31 bands may be used if more accurate modeling is desired.

Delay line lengths may be calculated dynamically based on observed room dimensions and may be used to scale the overall gain of the graphical EQ attenuator filters for different delay line lengths.

Referring now to 624 of FIG. 6 and 720 of FIG. 7, an example embodiment may comprise extracting reflecting surface(s) from audio scene description format scene description 612 (EIF scene description in FIG. 6) and/or based on physical room information 730 (FIG. 7). Alternatives are here presented for extracting reflection parameters, for example surfaces, from the audio scene description format data. The audio scene description format data may contain virtual scene geometry defined as meshes and/or geometric primitives, such as boxes or cylinders. In an example embodiment in which the audio scene description format data comprises geometric primitives, the geometric primitives may be converted to meshes. In another example, geometric primitives may be extracted separately if they are determined relevant for early reflection synthesis, and transmitted in the bitstream or otherwise indicated as being relevant for early reflection synthesis.

Figure 10:
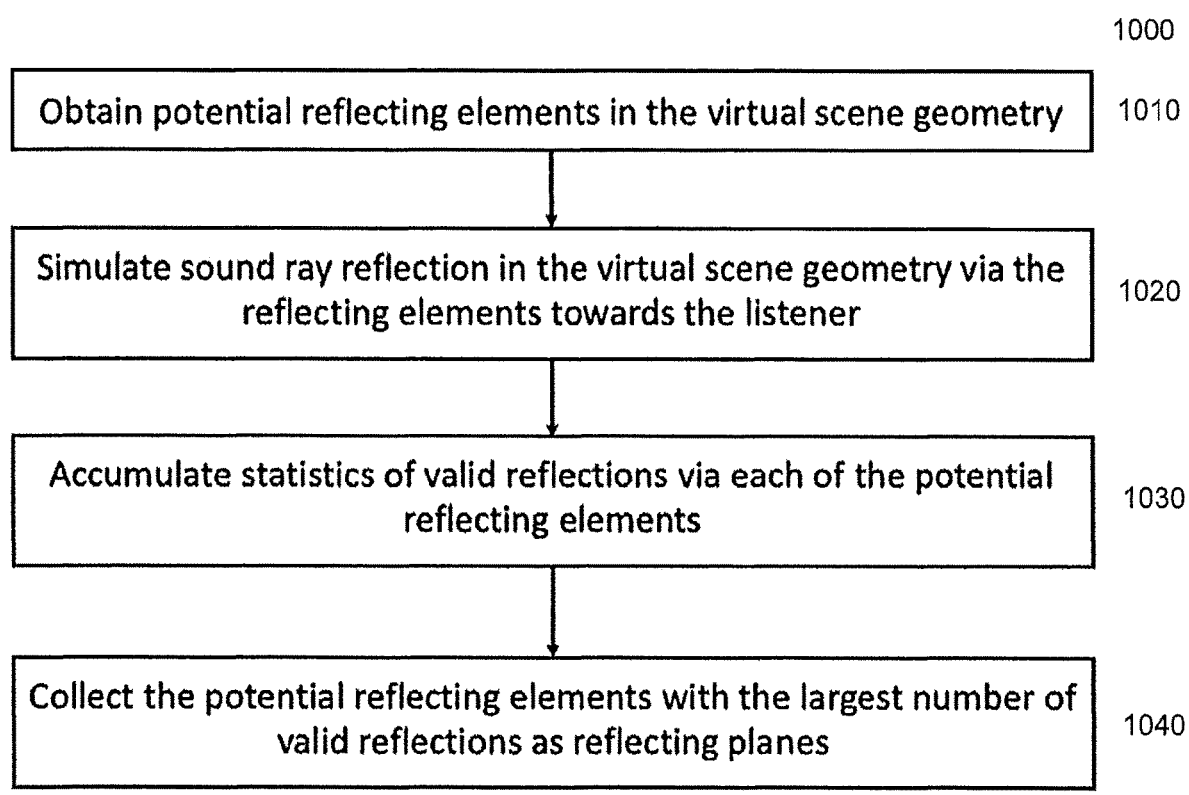
FIG. 10 is a flowchart illustrating steps as described herein.

Referring now to FIG. 10, illustrated are the potential steps of an example method 1000. The example method 1000 may include obtaining potential/possible/candidate reflecting elements in the virtual scene geometry, 1010. The obtained potential reflecting elements may be the elements of the virtual scene which may reflect sound. The virtual scene geometry may be the geometry of a captured audio/sound scene or a constructed audio/sound scene, and the geometry may be comprised by an audio scene description format description and/or physical room information. In an example embodiment, the reflection parameters, for example reflecting planes, in the scene geometry may be indicated in the audio scene description format file. This indication may comprise inclusion in the audio scene description format file of a new field referred to as ReflectingPlane and associated to an acoustic environment $a_{id}$ and/or a mesh $m_{id}$. Alternatively, the reflecting parameters in the scene geometry may be indicated in a (binary) bitstream (i.e. 630). The ReflectingPlane field may contain as its data the indices of the vertices in the mesh $m_{id}$ which together form the ReflectingPlane. Alternatively, the reflecting parameters, for example reflection planes, in the scene geometry may be extracted from or derived based on physical room information 730. In another example embodiment, the social VR metadata 312 described in FIG. 3 may be used instead of, or in addition to, the physical room information 730 of FIG. 7 to obtain reflecting parameters.

This obtaining of potential reflecting elements may be done by reduction of irrelevant geometric elements based on a procedure comprising: going through/determining each of the faces in the acoustic environment; calculating the normal of the faces; determining the faces which share at least one edge and grouping the faces accordingly; and forming polygons of grouped faces (i.e. find the free boundary around edges bounding the grouped faces). In other words, faces sharing an edge and having the same normal may be considered part of a same polygon, thereby allowing for definition of fewer reflecting elements which may be used in example method 1000 of FIG. 10. Alternatively or additionally, the faces making up the encompassing polygon may be preserved for use in example method 1000, as there may be situations in which a face is more relevant than the encompassing polygon. In other embodiments, inner contours may be found as well. Alternatively or additionally, the obtaining of the potential reflecting elements in the virtual scene geometry may comprise picking/choosing/selecting/determining the geometric elements in the virtual scene description which have an acoustic material description associated to them. Accordingly, geometric elements in the virtual scene description that are not associated with an acoustic material description might not be considered as potential reflecting elements, as audio scene description format (e.g. EIF) elements without material description may be considered acoustically transparent.

The example method 1000 may include simulating sound ray reflection in the virtual scene geometry via the reflecting elements towards the listener, 1020. The example method 1000 may also include accumulating statistics of valid reflections via each of the potential reflecting elements, 1030. The example method 1000 may also include collecting the potential reflecting elements with the largest number of valid reflections as reflecting parameters, for example reflecting planes, 1040. This simulation of sound ray reflection in the virtual space 1020 may allow determination of the respective relevance of the obtained potential reflecting elements. The location of the listener may be estimated or simulated at this step. For example, a moving listener may be simulated in the virtual space. In an example embodiment, the intersection of rays with different surfaces (i.e. different potential reflecting elements) as the paths of early reflections, up to a certain maximum order, are simulated in the virtual space may be accumulated. This simulation may comprise: creating image sources up to a maximum order for each of the sound sources and potential reflecting elements in the virtual scene; moving a virtual listener along a sampled position trajectory through an acoustic space in the virtual scene; casting rays between the listener at each sampled position and the sound sources using the image sources and potential reflecting parameters in the scene geometry (such as determined faces in the scene); for each of the faces in the scene geometry, accumulating the number of sound rays which have reflected from it (i.e. determine the number of times a valid reflection path of some order has intersected this potential reflecting element/face), 1030; after the listener has progressed through the scene or the position trajectory, obtaining the final accumulated counts of reflections for each of the potential reflecting elements/faces, 1030; picking the M faces/potential reflecting elements with the largest number of reflections as the reflecting parameters, 1040. During a step of simulating/casting rays between the listener and the sound sources at each sampled position, the sound sources may be assumed to be on constantly.

In an example embodiment, the number of reflecting faces determined with the example method FIG. 10 may optionally be further reduced as follows: for the M reflecting faces, define their surface normal; for each group of two faces in the set J, where the set J is formed of groups of faces having the same normal, check if the group of faces share at least one edge; if the group of faces share an edge, remove the shared edge to combine the faces; and output the set of faces remaining after this processing as the reflecting parameters.

In an example embodiment, the encoder, e.g. 640 of FIGS. 6 and 7, (or content creator/user) may determine the relevance or importance of different reflecting parameters. The importance may relate to the relevance of the reflecting parameters to different orders of early reflection rendering. For example, an importance (value/indication/indicator) for a reflecting parameter may indicate that this reflecting parameter is relevant only if the renderer is to render at least 4th order reflections, as the reflecting parameter, for example a reflection plane, will not be hit by rays otherwise. If a certain order of reflections is not to be rendered, the reflecting parameter may not be relevant, and therefore not be used for simulation of reverberation. As another example, there may be multiple levels of reflecting parameters where more important or coarser reflecting parameters, for example reflection planes, may hide more detailed reflecting planes, and where coarser reflecting planes may be intended for lower complexity renderers which render lower orders of early reflections, and renderers capable of rendering higher reflection orders may ignore the coarser reflection planes to reveal more detailed reflecting planes to render higher resolution early reflections. This mechanism may allow essentially several descriptions (or "description levels") to co-exist by using the importance to select what to consider in the rendering. This may give the scene author a mechanism to describe what is important (possibly for several levels of detail) so that each encoder and renderer may concentrate on making the most of the information that is most likely relevant to it (e.g. by making tradeoffs between reflection order and geometry "fidelity"). As a concrete example of encoding a virtual scene, consider a virtual scene comprising a corridor. The same virtual scene comprising a corridor may be described with two levels of detail: (1) a higher level of detail with several "embeddings" in the walls (2) a lower level of detail that only has straight walls. One of these descriptions of the virtual scene may be indicated to a renderer, and the determination of relevant reflecting parameters may be performed accordingly, i.e. different reflecting parameters may be determined according to each description.

In an example embodiment, sound sources may be moving or animated. Where the sound sources are moving sound sources, the movement trajectory of a moving sound source may be quantized to a fixed number of discrete positions, and the above procedure for simulating sound ray reflections and accumulating statistics of valid reflections may be repeated for the discrete positions. This may make it possible to discover reflecting parameters, for example reflection planes, which can be relevant for a certain position of a sound source, even if not for other positions of the sound source.

Figure 11:
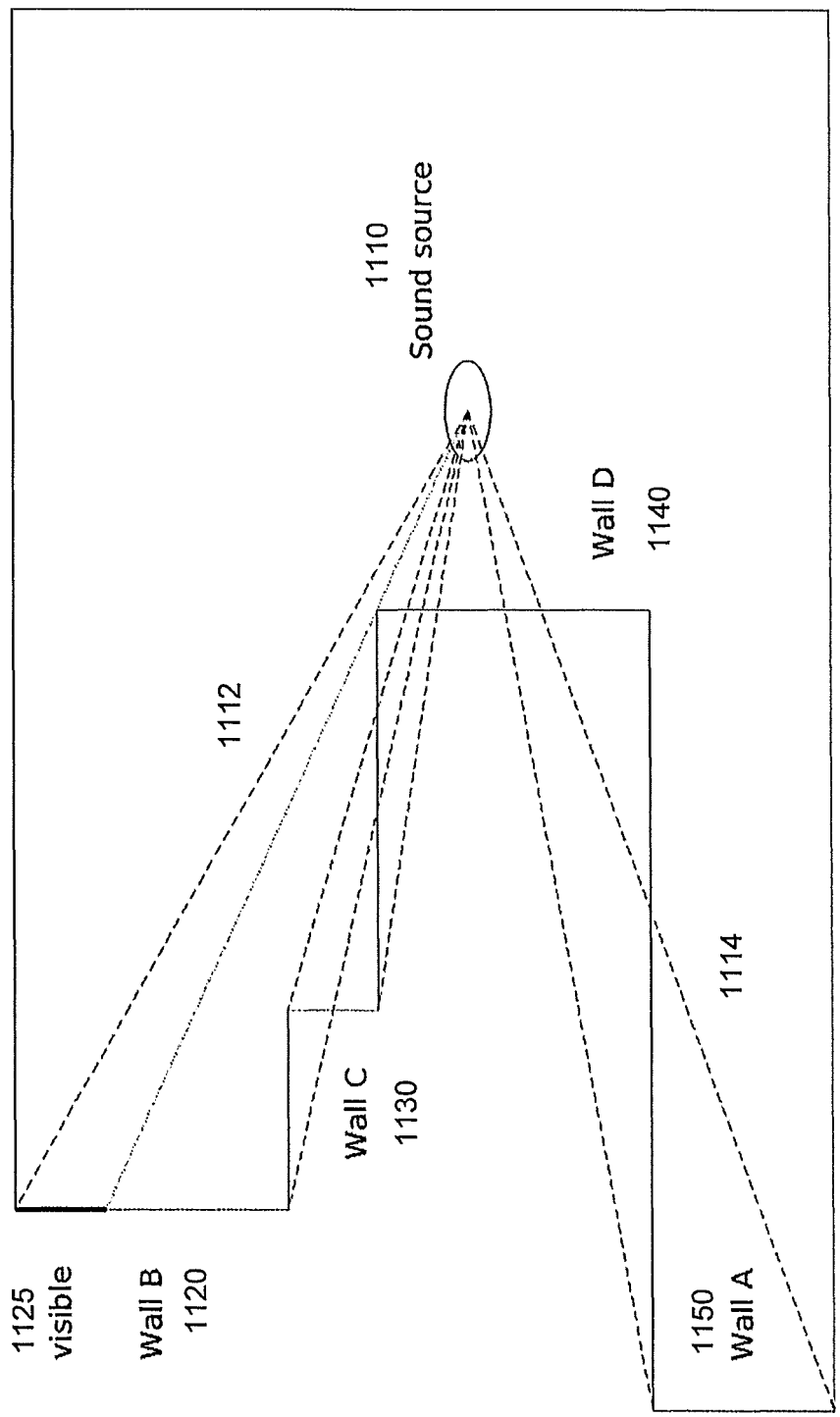
FIG. 11 is a diagram illustrating features as described herein.

In an example embodiment, an alternative to simulating sound ray reflection(s) in the virtual scene geometry via the reflecting elements towards the listener, 1020 may comprise use of a beam tracing approach. Reference is now made to FIG. 11, which comprises an example of reflection from a sound source for purposes of illustrating the use of a beam tracing approach for simulating sound ray reflection in a virtual scene geometry. The beam tracing approach may comprise forming actual beam(s) (i.e. polygonal cross section(s)) from sound sources towards each potential reflecting plane, which may be determined or obtained at step 1010 of FIG. 10. In FIG. 11, the beam may be considered to be a transmission of sound from sound source 1110 within an angle defined between 1112 and 1114. The beam is illustrated as intersecting with some potential reflecting elements, which in the present example are illustrated as walls A-D (1150, 1120, 1130, 1140) of a room in which sound source 1110 is located. If any part of the beam hits a potential reflecting element/surface, then that surface may be considered a true reflecting parameter (e.g. reflection plane) for the sound source 1110. Then the beam may be reflected from the part of the surface(s) which was hit to find reflections of increasingly higher order. In FIG. 11, the beam from sound source 1110 is illustrated to at least hit the visible/not occluded portion 1125 of Wall B, 1120. Therefore, 1125 may be considered a true reflecting parameter for the sound source. The beam may also be considered to hit a portion of Wall D, 1140. Wall C, 1130 and Wall A, 1150 are not considered to be hit, as there is not a clear path between sound source 1110 and those walls. In other words, the beams towards Wall C, 1130 and Wall A, 1150 are fully occluded. However, a higher order reflection may be determined to hit one of those walls. Reflection from the potential reflecting elements to other potential reflecting elements is not illustrated in FIG. 11.

It should be noted that a beam may be split if only part of the beam hits a reflecting surface. For example, in FIG. 11, only part of a beam from sound source 1110 hits visible portion 1125 of Wall B 1120. The beam may be considered to be split between the portion hitting 1125 and other portion(s), e.g. Wall D 1140. One part of the beam may continue along the original path, whereas a new (smaller) part continues as the reflected beam, i.e. a portion of the beam may be reflected from Wall D 1140 while another portion of the beam may continue on to hit 1125.

Depending on the position of a sound source, the sound rays emitted from it may hit some geometric elements in the scene and not hit some other geometric elements in the scene. For example, in FIG. 11, sound rays emitted from sound source 1110 may hit a portion of Wall B 1120, i.e. 1125, but not hit Wall A 1150. Moreover, if a sound source is moving along an animated trajectory, then the reflecting parameters, for example reflection planes, may change for different positions of the sound source trajectory. In an example embodiment, the reflecting parameters may be created and signaled, whether during encoding phase, decoding/rendering phase, or both, so that each sound source in the scene has its own set of reflecting parameters, or so that subsets of sound sources have separate set(s) of reflecting parameters. The benefit of obtaining reflecting parameters for each sound source individually may be that the number of reflecting parameters per sound source may be smaller than the number of reflecting parameters for all sound sources in a scene; this then means that when early reflections are traced for a sound source, it may be sufficient to test only for the reflecting parameters, for example reflection planes, which are relevant for that specific sound source or group of sound sources, thus reducing computational load. In a case where a binary-space-partitioning (BSP) tree approach is used for tracking early reflections, a BSP may be generated per sound source. Each such BSP may be somewhat smaller than a single BSP which contains all the necessary information for all the sound sources. This may be advantageous for more complex scenes where partitioning of the scene (e.g. into groups of sound sources, areas/regions of the scene, etc.) may yield benefits.

In an example embodiment, the obtained reflecting parameters may be associated with a certain set of positions of sound sources in the scene. In other words, a different set of reflecting parameters may be determined to be relevant for different positions of a sound source or a set of sound sources. The bitstream 630 may contain/transmit the reflecting parameters associated to a certain range of sound source positions. Alternatively, a lookup table may contain the reflecting parameters associated with certain sound source positions. The set of (applicable/relevant) reflecting parameters may be updated depending on the position of the sound sources.

In an example embodiment, the reflecting parameters may be associated with a certain position(s) of the listener in the scene. In other words, a different set of reflecting parameters may be relevant for certain listener positions.

In an example embodiment, the reflecting parameters may be associated with different configurations of scene geometric elements. For example, an opening door in the scene may cause changes in potential reflection paths of sound rays in the scene and may change the relevance of different reflecting elements. Thus, the reflecting parameters may be associated to a state of geometric scene elements; for example, one set of reflecting parameters may be associated to the state of "door open," whereas another set of reflecting parameters may be associated to the state of "door closed."

In an example embodiment, reflecting parameters may be associated with combinations of these, for example, a combination of sound source index, sound source position, listener position, and/or scene geometry state.

Figure 12:
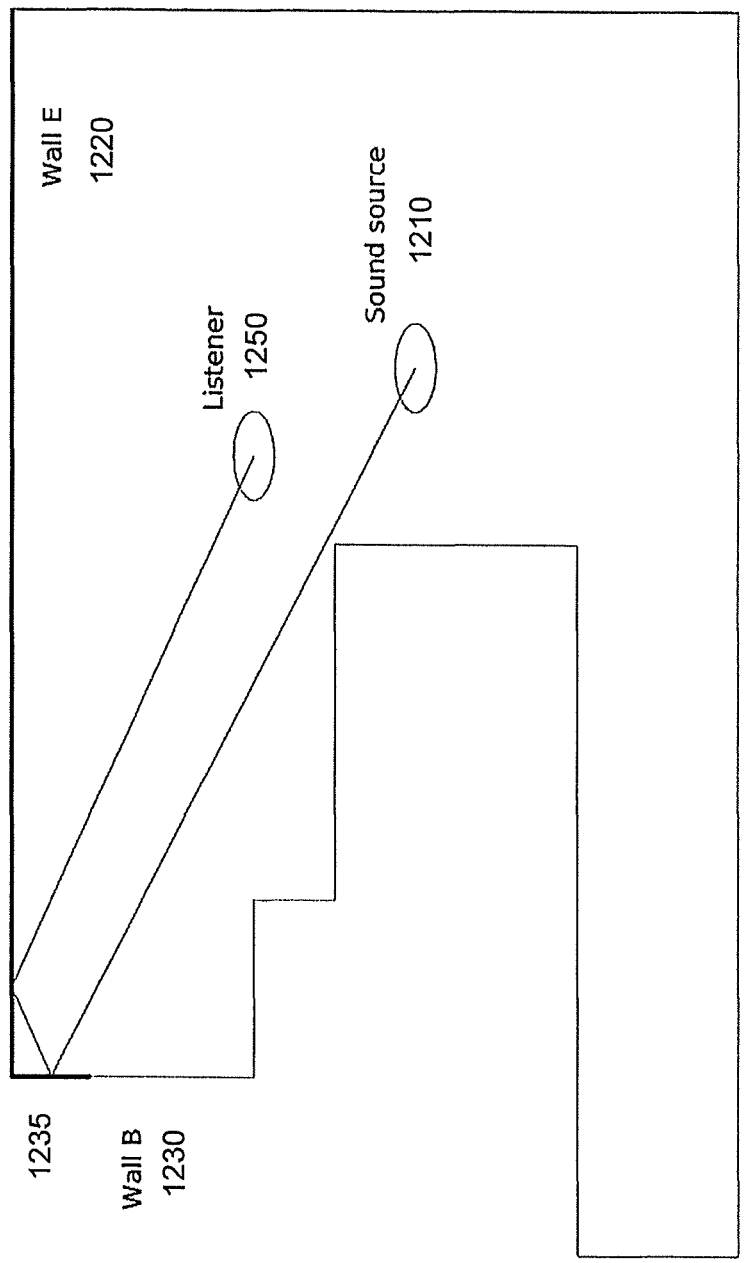
FIG. 12 is a diagram illustrating features as described herein.

The reflecting parameters for early reflection rendering obtained in step 1010 of the example method illustrated by FIG. 10 may be obtained from the bitstream in a VR scenario, e.g. MPEG-I/MPEG-H bitstream 630 in FIG. 6. In an AR scenario, as described above, the reflecting parameters for early reflection rendering obtained in step 1010 of the example method illustrated by FIG. 10 may be obtained based on physical room information 710, which may be comprised by a lookup table. To synthesize an early reflection, the sound propagation from sound source may be traced via the reflecting parameters, for example reflection planes, to the listener. The propagation path length may define the delay which needs to be applied in a delay line to the signal and also the amount of attenuation. Referring now to FIG. 12, illustrated is an example of finding early reflection paths using reflecting parameters. In the example of FIG. 12, portion 1235 of Wall B, 1230, and Wall E, 1220, have been determined to be true reflecting surfaces, for example according to the method illustrated in FIG. 10.

Second order reflection from sound source 1210 to Wall B, 1230, at 1235 to Wall E, 1220 may be traced to listener 1250 based on the surfaces that have previously been determined to be true reflecting surfaces. A certain order of early reflections may be simulated this way and encoded into higher order ambisonics for spatialization and auralization, as in FIGS. 6 and 7 at 670.

The late reverberation path may start with the specific outputs from the delay line which may be directed to the diffuse late reverb module such as 656, illustrated in FIGS. 6 and 7. The diffuse late reverb module may be implemented with one or more FDNs 800 as illustrated in FIG. 8. The signals may be fed through a diffuse-to-direct ratio filter to control the amount of diffuse energy. The FDN 800 may take as input the input signal 810, run it through a complex network of feedback delays, and then pick up output (852, 856) from different delay lines D of the network for multiple spatial channels. Each delay line may be assigned to a different spatial channel for maximally/maximum diffuse reverberation. The reverberated channels may then be encoded to HOA for spatialization, as in FIGS. 6 and 7 at 670. It is noted that encoding early reflections and/or FDN delay lines to HOA is an optional step and may be omitted and/or replaced with encoding to virtual loudspeaker signals with VBAP. If encoding to HOA or VBAP is omitted, then a signal may be spatialized directly via HRTF filtering.

The direct sound may be spatialized directly with binauralization or vector-base amplitude panning (VBAP) after applying the appropriate propagation delay, air absorption, and/or other desired effects, as at 658 of FIGS. 6 and 7.

Spatialization of discrete early reflections and diffuse late reverberation may be, optionally, done through higher order ambisonics (HOA) encoding, as noted above, which in some scenarios may limit the computational cost compared to direct spatialization. Alternatively, they can be spatialized through virtual loudspeaker signals obtained via VBAP panning. Spatialization may depend on the target format of the system and may be, e.g., vector-base amplitude panning (VBAP), binaural panning, or HOA-panning. Spatialization may depend on or correspond to user position & pose and/or position & pose update, as at 644 and 660 of FIGS. 6 and 7. In FIGS. 6 and 7, the direct signal 658 may be fed to the common rendering unit 694. In many cases, the spatialization and rendering units may be combined into one unit, which may include modules 660, 670, and 690 (692, 694). A person of ordinary skill in the art would understand how these units may be combined.

The encoder, e.g. 640 of FIGS. 6 and 7, may decide/determine a suitable order (of reflections) for rendering early reflections generated at 652 and encoded at 670. The suitable order may depend on the complexity of the scene, the number of sound sources, and/or computational constraints. The encoder may determine the suitable early reflection rendering order so that it is maximally large but may still be rendered in real time without audio glitches. The early reflection rendering order may be signaled in the bitstream to the renderer in a VR and/or AR scenario.

Different reverberators may be evaluated in the encoder, e.g. 620 of FIGS. 6 and 7, and their suitability for reproducing the reverberation may be signaled to the renderer 640. For example, the parameter set for the diffuse reverberation rendering may change depending on the diffuse reverberator implementation. There may be a plurality of different diffuse reverberator implementations existing in the renderer 640, and the encoder 620 may signal parameters for several of them, along with other parameters, which indicate their suitability or goodness for reproducing the desired reverberation characteristics of the scene defined in the audio scene description format (e.g. EIF).

A technical effect of example embodiments of the present disclosure may be to provide an efficient method for signaling and reproducing reverberation based on virtual scene geometry and desired reverberation characteristics. A technical effect of example embodiments of the present disclosure may be to provide support both for VR and AR scenarios. Example embodiments of the present disclosure might not provide a mechanism to reproduce the reverberation in a real room completely accurately, in particular for the early part of the reverberation. The accuracy of reverberation reproduction may be limited by the accuracy of the geometry description and may be more accurate with more accurate geometric descriptions, with the disadvantage of increased computational cost.

In an example embodiment, there may be defined a method for creating reverberated signals comprising: using the geometry of a virtual or physical scene to obtain the parameters for a discrete early reflection synthesizer; using the desired reverberation characteristics of a virtual or physical scene to obtain the parameters for a diffuse late reverberation generator; and creating the reverberated signals by combining the outputs of the discrete early reflection synthesizer and the diffuse late reverberation generator.

In an example embodiment, the parameters for the discrete early reflection synthesizer may comprise at least one reflecting parameter.

In an example embodiment, the reverberator parameters may be used in a feedback delay network (FDN) reverberator.

In an example embodiment, the reverberator parameters may contain attenuation filter coefficients, delay line lengths, and/or diffuse-to-direct ratio control filter coefficients In an example embodiment, the reverberation parameters may be obtained using an optimization algorithm operating based on an audio scene description format (e.g. encoder input format (EIF)) file containing scene geometry and/or desired reverberation characteristics In an example embodiment, the reflecting parameter(s) may be manually defined, by a content creator/user, in an audio scene description format (e.g. encoder input format (EIF)) defined scene geometry.

In an example embodiment, the reflecting parameter(s) may be obtained by using an algorithm which processes predetermined acoustic environments in the virtual scene definition of the audio scene description format (e.g. encoder input format (EIF)) and identifies only significant reflecting plane(s) as reflecting parameter(s).

In an example embodiment, the obtained reflecting plane(s) may be used with a beam tracer algorithm to calculate the propagation path, delay, and/or sound level of a specular reflection from a sound source to a listener (i.e. one or more reflection parameters).

In an example embodiment, the encoder may further determine a suitable early reflection rendering order for the beam tracer and may signal this in the bitstream.

In an example embodiment, the reverberator parameters and the reflecting parameter(s) may be associated with an acoustic environment which bounds a certain region of the complete scene geometry.

In an example embodiment, the reverberator parameters and reflecting parameter(s) may be obtained based on physical room information obtained with a rendering device.

In an example embodiment, importance information may be determined and included in the audio scene description format (e.g. encoder input format (EIF)) file, or may be based on information in the audio scene description format (e.g. encoder input format (EIF)) file by the encoder, and associated to/with the reflecting parameter(s). The importance information may relate to the importance of the reflecting parameter(s) for certain orders of rendering early reflections (that is, some reflecting parameter(s) may be relevant only for higher orders of early reflection rendering, whereas some other plane(s) may be relevant even with lower order early reflection rendering).

In an example embodiment, the lookup table may store attenuation filter coefficients, delay line lengths, and/or direct-to-reverberant ratio filter coefficients for different room dimensions, and the room dimensions may be provided by an AR rendering device.

In an example embodiment, the physical room information may contain information on sound reflecting plane(s) in the physical environment and may be used to obtain at least one reflecting parameter.

Figure 13:
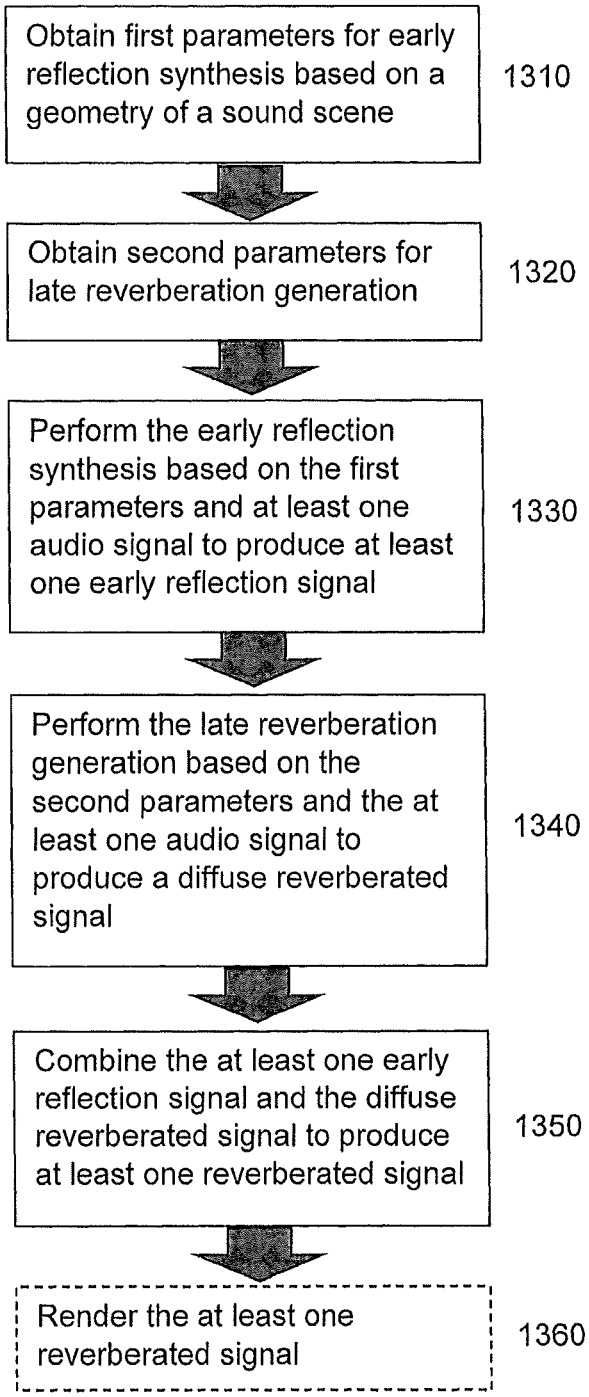
FIG. 13 is a flowchart illustrating steps as described herein.

FIG. 13 illustrates the potential steps of an example embodiment. In accordance with one aspect, an example method 1300 may be provided comprising: obtaining first parameters for early reflection synthesis based on a geometry of a sound scene, 1310; obtaining second parameters for late reverberation generation, 1320; performing the early reflection synthesis based on the first parameters and at least one audio signal to produce at least one early reflection signal, 1330; performing the late reverberation generation based on the second parameters and the at least one audio signal to produce a diffuse reverberated signal, 1340; combining the at least one early reflection signal and the diffuse reverberated signal to produce at least one reverberated signal 1350; and, optionally, rendering the at least one reverberated signal, 1360.

Figure 14:
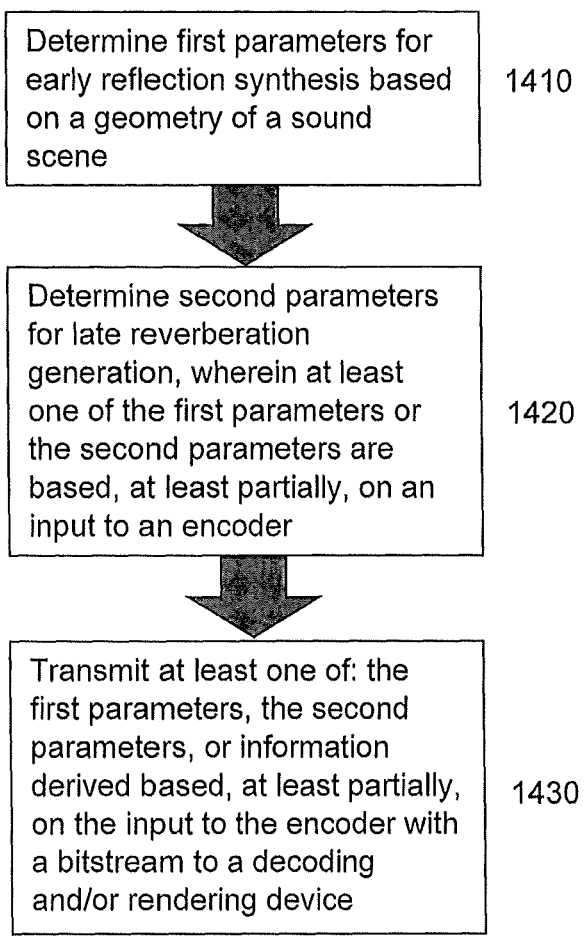
FIG. 14 is a flowchart illustrating steps as described herein.

FIG. 14 illustrates the potential steps of an example embodiment. In accordance with one aspect, an example method 1400 may be provided comprising: determining first parameters for early reflection synthesis based on a geometry of a sound scene, 1410; determining second parameters for late reverberation generation wherein at least one of the first parameters or the second parameters are derived based, at least partially, on an input to an encoder, 1420; and transmitting at least one or: the first parameters, the second parameters, or information derived based, at least partially, on the input to the encoder with a bitstream to a decoding and/or rendering device, 1430.

In accordance with one aspect, an example method may be provided comprising: obtaining first parameters for early reflection synthesis based on a geometry of a sound scene; obtaining second parameters for late reverberation synthesis; performing the early reflection synthesis based on the first parameters and at least one audio signal to produce at least one early reflection signal; performing the late reverberation synthesis based on the second parameters and the at least one audio signal to produce a diffuse reverberated signal; combining the at least one early reflection signal and the diffuse reverberated signal to produce at least one reverberated signal; and rendering the at least one reverberated signal.

The first parameters may comprise at least one of: a reflecting plane, a reflecting surface, a position, a delay, a level, or a direction of arrival.

The sound scene may comprise at least one of: a virtual reality sound scene, an augmented reality sound scene, or a real-world environment in which augmented reality content is consumed.

The second parameters may comprise at least one of: at least one attenuation filter coefficient, at least one delay line length, or at least one diffuse-to-direct ratio control filter coefficient.

The obtaining of the first parameters and the obtaining of the second parameters may comprise using information included in input to an encoder, wherein the input to the encoder may comprise at least one of: the geometry of the sound scene, wherein the geometry of the sound scene may comprise at least one of: one or more dimensions of the sound scene, one or more geometric primitives of the sound scene, one or more vertices of the sound scene, one or more mesh faces of the sound scene, or one or more meshes of the sound scene; desired reverberation characteristics of the sound scene; an indication of a desired sound decay time per frequency; or desired diffuse-to-direct ratio characteristics of the sound scene.

The performing of the late reverberation synthesis may comprise using the second parameters as input to a feedback delay network reverberator.

The performing of the late reverberation synthesis may further comprise: obtaining a dimension of the geometry of the sound scene; determining a length of at least one delay line of the feedback delay network reverberator based on the obtained dimension; determining coefficients for at least one attenuation filter of the feedback delay network reverberator based on one or more reverberation characteristics for the sound scene; and determining coefficients for at least one diffuse-to-direct ratio control filter based on one or more diffuse-to-direct ratio characteristics for the sound scene, wherein the second parameters may comprise the length, the coefficients for the at least one attenuation filter, and the coefficients for the at least one diffuse-to-direct ratio control filter.

The geometry of the sound scene may be defined in input to an encoder, wherein the obtaining of the first parameters may comprise identifying one or more significant planes in the geometry of the sound scene, wherein the first parameters may comprise the one or more identified significant planes.

The obtaining of the first parameters may comprise determining one or more early reflection characteristics of the geometry of the sound scene.

The obtaining of the first parameters may comprise: obtaining one or more potential reflecting elements of the geometry of the sound scene; determining at least one position of at least one sound source in the sound scene; forming a beam from the at least one position of the at least one sound source towards a respective one of the one or more potential reflecting elements; determining whether the beam or a reflection of the beam hits an element of the one or more potential reflecting elements; and determining at least one reflecting plane of the sound scene, wherein the at least one reflecting plane may comprise one or more of the one or more potential reflecting elements determined to be hit with the beam or the reflection of the beam, wherein the first parameters may comprise the at least one determined reflecting plane of the sound scene.

The obtaining of the first parameters may comprise: obtaining one or more potential reflecting elements of the geometry of the sound scene; determining one or more sound sources in the sound scene; determining one or more positions of a simulated listener in the sound scene; simulating a sound ray from a respective sound source of the one or more sound sources to a respective one of the one or more potential reflecting elements and determining whether the simulated sound ray or a reflection of the simulated sound ray reflects to a respective position of the one or more positions of the simulated listener, wherein a determination that the simulated sound ray or the reflection reflects to the position further may comprise incrementing a respective number of times the respective potential reflecting element reflects the simulated sound ray or the reflection towards the one or more positions of the simulated listener; and determining one or more reflecting planes of the one or more potential reflecting elements based, at least partially, on the respective number of times the one or more potential reflecting elements were involved in simulated sound ray reflection, wherein the first parameters may comprise the one or more determined reflecting planes.

The obtaining of the one or more potential reflecting elements of the geometry of the sound scene may comprise: determining one or more vertices of the geometry of the sound scene; determining one or more faces based on the one or more vertices; calculating a respective normal of the one or more faces; determining one or more sets of the one or more faces based on at least one shared edge; and forming respective polygons based on the one or more sets of faces, wherein the one or more potential reflecting elements may comprise the one or more formed polygons.

The obtaining of the one or more potential reflecting elements of the geometry of the sound scene may comprise selecting one or more geometric elements of the sound scene having an associated respective acoustic material description as the one or more potential reflecting elements.

The obtaining of the first parameters and/or the obtaining of the second parameters may be based, at least partially, on user input.

The performing of the early reflection synthesis may be further based on a reflection order signaled with a bitstream.

The first parameters and the second parameters may be associated with a region of the geometry of the sound scene.

The first parameters and the second parameters may be obtained based on physical room information obtained with a rendering device.

The physical room information may comprise at least one of: dimensions of the sound scene, or the geometry of the sound scene, wherein the first parameters and the second parameters are obtained based on the physical room information and a lookup table of the rendering device, wherein the lookup table may store, in association with potential dimensions and/or geometries of the sound scene, at least one of: at least one attenuation filter coefficient, at least one delay line length, or at least one direct-to-reverberant ratio filter coefficient.

The physical room information may comprise information regarding sound reflecting elements in the geometry of the sound scene, wherein the first parameters may comprise at least one reflecting plane determined based on the information regarding the sound reflecting elements.

The first parameters comprise at least one reflecting plane, the example method may further comprise: receiving an encoder input format file; determining importance information based on the encoder input format file, wherein the importance information may comprise at least one indication of an importance of a respective one of the at least one reflecting plane for one or more orders of early reflections.

The obtaining of the second parameters may be based, at least partially, on at least one of: an encoder input format file, an indication of a desired sound decay time per frequency, or the geometry of the sound scene.

The example method may further comprise: higher-order ambisonics encoding the at least one reverberated signal, wherein the rendering of the at least one reverberated signal may comprise decoding the at least one encoded reverberated signal to produce a binaural or loudspeaker output, wherein the binaural or loudspeaker output is rendered along with the at least one audio signal.

The at least one audio signal may comprise at least one of: a direct audio signal, a sound object, a channel, a higher-order ambisonics signal, or a dry audio signal.

In accordance with one example embodiment, an apparatus may comprise: circuitry configured to perform: obtain first parameters for early reflection synthesis based on a geometry of a sound scene; obtain second parameters for late reverberation synthesis; perform the early reflection synthesis based on the first parameters and at least one audio signal to produce at least one early reflection signal; perform the late reverberation synthesis based on the second parameters and the at least one audio signal to produce a diffuse reverberated signal; combine the at least one early reflection signal and the diffuse reverberated signal to produce at least one reverberated signal; and render the at least one reverberated signal.

In accordance with one example embodiment, an apparatus may comprise: processing circuitry; memory circuitry including computer program code, the memory circuitry and the computer program code configured to, with the processing circuitry, enable the apparatus to: obtain first parameters for early reflection synthesis based on a geometry of a sound scene; obtain second parameters for late reverberation synthesis; perform the early reflection synthesis based on the first parameters and at least one audio signal to produce at least one early reflection signal; perform the late reverberation synthesis based on the second parameters and the at least one audio signal to produce a diffuse reverberated signal; combine the at least one early reflection signal and the diffuse reverberated signal to produce at least one reverberated signal; and render the at least one reverberated signal.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise: at least one processor; and at least one memory including computer program code; the at least one memory and the computer program code configured to, with the at least one processor, cause the apparatus to: obtain first parameters for early reflection synthesis based on a geometry of a sound scene; obtain second parameters for late reverberation synthesis; perform the early reflection synthesis based on the first parameters and at least one audio signal to produce at least one early reflection signal; perform the late reverberation synthesis based on the second parameters and the at least one audio signal to produce a diffuse reverberated signal; combine the at least one early reflection signal and the diffuse reverberated signal to produce at least one reverberated signal; and render the at least one reverberated signal.

The first parameters may comprise at least one of: a reflecting plane, a reflecting surface, a position, a delay, a level, or a direction of arrival.

The sound scene may comprise at least one of: a virtual reality sound scene, an augmented reality sound scene, or a real-world environment in which augmented reality content is consumed.

The second parameters may comprise at least one of: at least one attenuation filter coefficient, at least one delay line length, or at least one diffuse-to-direct ratio control filter coefficient.

The obtaining of the first parameters and the obtaining of the second parameters may comprise using information included in input to an encoder, wherein the input to the encoder may comprise at least one of: the geometry of the sound scene, wherein the geometry of the sound scene may comprise at least one of: one or more dimensions of the sound scene, one or more geometric primitives of the sound scene, one or more vertices of the sound scene, one or more mesh faces of the sound scene, or one or more meshes of the sound scene; desired reverberation characteristics of the sound scene; an indication of a desired sound decay time per frequency; or desired diffuse-to-direct ratio characteristics of the sound scene.

The performing of the late reverberation synthesis may comprise using the second parameters as input to a feedback delay network reverberator.

The performing of the late reverberation synthesis may further comprise: obtaining a dimension of the geometry of the sound scene; determining a length of at least one delay line of the feedback delay network reverberator based on the obtained dimension; determining coefficients for at least one attenuation filter of the feedback delay network reverberator based on one or more reverberation characteristics for the sound scene; and determining coefficients for at least one diffuse-to-direct ratio control filter based on one or more diffuse-to-direct ratio characteristics for the sound scene, wherein the second parameters may comprise the length, the coefficients for the at least one attenuation filter, and the coefficients for the at least one diffuse-to-direct ratio control filter.

The geometry of the sound scene may be defined in input to an encoder, wherein the obtaining of the first parameters may comprise identifying one or more significant planes in the geometry of the sound scene, wherein the first parameters may comprise the one or more identified significant planes.

The obtaining of the first parameters may comprise determining one or more early reflection characteristics of the geometry of the sound scene.

The obtaining of the first parameters may comprise: obtaining one or more potential reflecting elements of the geometry of the sound scene; determining at least one position of at least one sound source in the sound scene; forming a beam from the at least one position of the at least one sound source towards a respective one of the one or more potential reflecting elements; determining whether the beam or a reflection of the beam hits an element of the one or more potential reflecting elements; and determining at least one reflecting plane of the sound scene, wherein the at least one reflecting plane may comprise one or more of the one or more potential reflecting elements determined to be hit with the beam or the reflection of the beam, wherein the first parameters may comprise the at least one determined reflecting plane of the sound scene.

The obtaining of the first parameters may further comprise: obtaining one or more potential reflecting elements of the geometry of the sound scene; determining one or more sound sources in the sound scene; determining one or more positions of a simulated listener in the sound scene; simulating a sound ray from a respective one of the one or more sound sources to a respective element of the one or more potential reflecting elements and determining whether the simulated sound ray or a reflection of the simulated sound ray reflects to a position of the one or more positions of the simulated listener, wherein a determination that the simulated sound ray or the reflection reflects to the position may further comprise incrementing a respective number of times the respective potential reflecting element reflects the simulated sound ray or the reflection towards the one or more positions of the simulated listener; and determining one or more reflecting planes of the one or more potential reflecting elements based, at least partially, on the respective number of times the one or more potential reflecting elements were involved in simulated sound ray reflection, wherein the first parameters may comprise the one or more determined reflecting planes.

The obtaining of the one or more potential reflecting elements of the geometry of the sound scene may comprise: determining one or more vertices of the geometry of the sound scene; determining one or more faces based on the one or more vertices; calculating a respective normal of the one or more faces; determining one or more sets of the one or more faces based on at least one shared edge; and forming respective polygons based on the one or more sets of faces, wherein the one or more potential reflecting elements may comprise the one or more formed polygons.

The obtaining of the one or more potential reflecting elements of the geometry of the sound scene may comprise selecting one or more geometric elements of the sound scene having an associated respective acoustic material description as the one or more potential reflecting elements.

The obtaining of the first parameters and/or the obtaining of the second parameters may be based, at least partially, on user input.

The performing of the early reflection synthesis may be further based on a reflection order signaled with a bitstream.

The first parameters and the second parameters may be associated with a region of the geometry of the sound scene.

The first parameters and the second parameters may be obtained based on physical room information obtained with a rendering device.

The physical room information may comprise at least one of: dimensions of the sound scene, or the geometry of the sound scene, wherein the first parameters and the second parameters may be obtained based on the physical room information and a lookup table of the rendering device, wherein the lookup table may store, in association with potential dimensions and/or geometries of the sound scene, at least one of: at least one attenuation filter coefficient, at least one delay line length, or at least one direct-to-reverberant ratio filter coefficient.

The physical room information may comprise information regarding sound reflecting elements in the geometry of the sound scene, wherein the first parameters may comprise at least one reflecting plane determined based on the information regarding the sound reflecting elements.

The first parameters may comprise at least one reflecting plane, wherein the example apparatus may be further configured to: receive an encoder input format file; and determine importance information based on the encoder input format file, wherein the importance information may comprise at least one indication of an importance of a respective one of the at least one reflecting plane for one or more orders of early reflections.

The obtaining of the second parameters may be based, at least partially, on at least one of: an encoder input format file, an indication of a desired sound decay time per frequency, or the geometry of the sound scene.

The example apparatus may be further configured to: higher-order ambisonics encode the at least one reverberated signal, wherein the rendering of the at least one reverberated signal may comprise decoding the at least one encoded reverberated signal to produce a binaural or loudspeaker output, wherein the binaural or loudspeaker output may be rendered along with the at least one audio signal.

The at least one audio signal may comprise at least one of: a direct audio signal, a sound object, a channel, a higher-order ambisonics signal, or a dry audio signal.

In accordance with one example embodiment, an apparatus may comprise means for performing: obtaining first parameters for early reflection synthesis based on a geometry of a sound scene; obtaining second parameters for late reverberation synthesis; performing the early reflection synthesis based on the first parameters and at least one audio signal to produce at least one early reflection signal; performing the late reverberation synthesis based on the second parameters and the at least one audio signal to produce a diffuse reverberated signal; combining the at least one early reflection signal and the diffuse reverberated signal to produce at least one reverberated signal; and rendering the at least one reverberated signal.

The first parameters may comprise at least one of: a reflecting plane, a reflecting surface, a position, a delay, a level, or a direction of arrival.

The sound scene may comprise at least one of: a virtual reality sound scene, an augmented reality sound scene, or a real-world environment in which augmented reality content is consumed.

The second parameters may comprise at least one of: at least one attenuation filter coefficient, at least one delay line length, or at least one diffuse-to-direct ratio control filter coefficient.

The obtaining of the first parameters and the obtaining of the second parameters may comprise using information included in input to an encoder, wherein the input to the encoder may comprise at least one of: the geometry of the sound scene, wherein the geometry of the sound scene may comprise at least one of: one or more dimensions of the sound scene, one or more geometric primitives of the sound scene, one or more vertices of the sound scene, one or more mesh faces of the sound scene, or one or more meshes of the sound scene; desired reverberation characteristics of the sound scene; an indication of a desired sound decay time per frequency; or desired diffuse-to-direct ratio characteristics of the sound scene.

The performing of the late reverberation synthesis may comprise using the second parameters as input to a feedback delay network reverberator.

The performing of the late reverberation synthesis may further comprise: obtaining a dimension of the geometry of the sound scene; determining a length of at least one delay line of the feedback delay network reverberator based on the obtained dimension; determining coefficients for at least one attenuation filter of the feedback delay network reverberator based on one or more reverberation characteristics for the sound scene; and determining coefficients for at least one diffuse-to-direct ratio control filter based on one or more diffuse-to-direct ratio characteristics for the sound scene, wherein the second parameters may comprise the length, the coefficients for the at least one attenuation filter, and the coefficients for the at least one diffuse-to-direct ratio control filter.

The geometry of the sound scene may be defined in input to an encoder, wherein the obtaining of the first parameters may comprise identifying one or more significant planes in the geometry of the sound scene, wherein the first parameters may comprise the one or more identified significant planes.

The obtaining of the first parameters may comprise determining one or more early reflection characteristics of the geometry of the sound scene.

The obtaining of the first parameters may comprise: obtaining one or more potential reflecting elements of the geometry of the sound scene; determining at least one position of at least one sound source in the sound scene; forming a beam from the at least one position of the at least one sound source towards a respective one of the one or more potential reflecting elements; determining whether the beam or a reflection of the beam hits an element of the one or more potential reflecting elements; and determining at least one reflecting plane of the sound scene, wherein the at least one reflecting plane comprises one or more of the one or more potential reflecting elements determined to be hit with the beam or the reflection of the beam, wherein the first parameters may comprise the at least one determined reflecting plane of the sound scene.

The obtaining of the first parameters may comprise: obtaining one or more potential reflecting elements of the geometry of the sound scene; determining one or more sound sources in the sound scene; determining one or more positions of a simulated listener in the sound scene; simulating a sound ray from a respective sound source of the one or more sound sources to a respective one of the one or more potential reflecting elements and determining whether the simulated sound ray or a reflection of the simulated sound ray reflects to a respective position of the one or more positions of the simulated listener, wherein a determination that the simulated sound ray or the reflection reflects to the position may further comprise incrementing a respective number of times the respective potential reflecting element reflects the simulated sound ray or the reflection towards the one or more positions of the simulated listener; and determining one or more reflecting planes of the one or more potential reflecting elements based, at least partially, on the respective number of times the one or more potential reflecting elements were involved in simulated sound ray reflection, wherein the first parameters may comprise the one or more determined reflecting planes.

The obtaining of the one or more potential reflecting elements of the geometry of the sound scene may comprise: determining one or more vertices of the geometry of the sound scene; determining one or more faces based on the one or more vertices; calculating a respective normal of the one or more faces; determining one or more sets of the one or more faces based on at least one shared edge; and forming respective polygons based on the one or more sets of faces, wherein the one or more potential reflecting elements may comprise the one or more formed polygons.

The obtaining of the one or more potential reflecting elements of the geometry of the sound scene may comprise selecting one or more geometric elements of the sound scene having an associated respective acoustic material description as the one or more potential reflecting elements.

The obtaining of the first parameters and/or the obtaining of the second parameters may be based, at least partially, on user input.

The performing of the early reflection synthesis may be further based on a reflection order signaled with a bitstream.

The first parameters and the second parameters may be associated with a region of the geometry of the sound scene.

The first parameters and the second parameters may be obtained based on physical room information obtained with a rendering device.

The physical room information may comprise at least one of: dimensions of the sound scene, or the geometry of the sound scene, wherein the first parameters and the second parameters may be obtained based on the physical room information and a lookup table of the rendering device, wherein the lookup table may store, in association with potential dimensions and/or geometries of the sound scene, at least one of: at least one attenuation filter coefficient, at least one delay line length, or at least one direct-to-reverberant ratio filter coefficient.

The physical room information may comprise information regarding sound reflecting elements in the geometry of the sound scene, wherein the first parameters may comprise at least one reflecting plane determined based on the information regarding the sound reflecting elements.

The first parameters may comprise at least one reflecting plane, wherein the example apparatus may further comprise means for performing: receiving an encoder input format file; and determining importance information based on the encoder input format file, wherein the importance information may comprise at least one indication of an importance of a respective one of the at least one reflecting plane for one or more orders of early reflections.

The obtaining of the second parameters may be based, at least partially, on at least one of: an encoder input format file, an indication of a desired sound decay time per frequency, or the geometry of the sound scene.

The example apparatus may further comprise means for performing: higher-order ambisonics encoding of the at least one reverberated signal, wherein the rendering of the at least one reverberated signal may comprise decoding the at least one encoded reverberated signal to produce a binaural or loudspeaker output, wherein the binaural or loudspeaker output may be rendered along with the at least one audio signal.

The at least one audio signal may comprise at least one of: a direct audio signal, a sound object, a channel, a higher-order ambisonics signal, or a dry audio signal.

In accordance with one example embodiment, a non-transitory computer-readable medium comprising program instructions stored thereon which, when executed with at least one processor, cause the at least one processor to: obtain first parameters for early reflection synthesis based on a geometry of a sound scene; obtain second parameters for late reverberation synthesis; perform the early reflection synthesis based on the first parameters and at least one audio signal to produce at least one early reflection signal; perform the late reverberation synthesis based on the second parameters and the at least one audio signal to produce a diffuse reverberated signal; combine the at least one early reflection signal and the diffuse reverberated signal to produce at least one reverberated signal; and render the at least one reverberated signal.

The first parameters may comprise at least one of: a reflecting plane, a reflecting surface, a position, a delay, a level, or a direction of arrival.

The sound scene may comprise at least one of: a virtual reality sound scene, an augmented reality sound scene, or a real-world environment in which augmented reality content is consumed.

The second parameters may comprise at least one of: at least one attenuation filter coefficient, at least one delay line length, or at least one diffuse-to-direct ratio control filter coefficient.

The obtaining of the first parameters and the obtaining of the second parameters may comprise using information included in input to an encoder, wherein the input to the encoder may comprise at least one of: the geometry of the sound scene, wherein the geometry of the sound scene may comprise at least one of: one or more dimensions of the sound scene, one or more geometric primitives of the sound scene, one or more vertices of the sound scene, one or more mesh faces of the sound scene, or one or more meshes of the sound scene; desired reverberation characteristics of the sound scene; an indication of a desired sound decay time per frequency; or desired diffuse-to-direct ratio characteristics of the sound scene.

The performing of the late reverberation synthesis may comprise using the second parameters as input to a feedback delay network reverberator.

The performing of the late reverberation synthesis may further comprise: obtaining a dimension of the geometry of the sound scene; determining a length of at least one delay line of the feedback delay network reverberator based on the obtained dimension; determining coefficients for at least one attenuation filter of the feedback delay network reverberator based on one or more reverberation characteristics for the sound scene; and determining coefficients for at least one diffuse-to-direct ratio control filter based on one or more diffuse-to-direct ratio characteristics for the sound scene, wherein the second parameters may comprise the length, the coefficients for the at least one attenuation filter, and the coefficients for the at least one diffuse-to-direct ratio control filter.

The geometry of the sound scene may be defined in input to an encoder, wherein the obtaining of the first parameters may comprise identifying one or more significant planes in the geometry of the sound scene, wherein the first parameters may comprise the one or more identified significant planes.

The obtaining of the first parameters may comprise determining one or more early reflection characteristics of the geometry of the sound scene.

The obtaining of the first parameters may comprises: obtaining one or more potential reflecting elements of the geometry of the sound scene; determining at least one position of at least one sound source in the sound scene; forming a beam from the at least one position of the at least one sound source towards a respective one of the one or more potential reflecting elements; determining whether the beam or a reflection of the beam hits an element of the one or more potential reflecting elements; and determining at least one reflecting plane of the sound scene, wherein the at least one reflecting plane may comprise one or more of the one or more potential reflecting elements determined to be hit with the beam or the reflection of the beam, wherein the first parameters may comprise the at least one determined reflecting plane of the sound scene.

The obtaining of the first parameters may further comprise: obtaining one or more potential reflecting elements of the geometry of the sound scene; determining one or more sound sources in the sound scene; determining one or more positions of a simulated listener in the sound scene; simulating a sound ray from a respective one of the one or more sound sources to a respective element of the one or more potential reflecting elements and determining whether the simulated sound ray or a reflection of the simulated sound ray reflects to a position of the one or more positions of the simulated listener, wherein a determination that the simulated sound ray or the reflection reflects to the position may further comprise incrementing a respective number of times the respective potential reflecting element reflects the simulated sound ray or the reflection towards the one or more positions of the simulated listener; and determining one or more reflecting planes of the one or more potential reflecting elements based, at least partially, on the respective number of times the one or more potential reflecting elements were involved in simulated sound ray reflection, wherein the first parameters may comprise the one or more determined reflecting planes.

The obtaining of the one or more potential reflecting elements of the geometry of the sound scene may comprise: determining one or more vertices of the geometry of the sound scene; determining one or more faces based on the one or more vertices; calculating a respective normal of the one or more faces; determining one or more sets of the one or more faces based on at least one shared edge; and forming respective polygons based on the one or more sets of faces, wherein the one or more potential reflecting elements may comprise the one or more formed polygons.

The obtaining of the one or more potential reflecting elements of the geometry of the sound scene may comprise selecting one or more geometric elements of the sound scene having an associated respective acoustic material description as the one or more potential reflecting elements.

The obtaining of the first parameters and/or the obtaining of the second parameters may be based, at least partially, on user input.

The performing of the early reflection synthesis may be further based on a reflection order signaled with a bitstream.

The first parameters and the second parameters may be associated with a region of the geometry of the sound scene.

The first parameters and the second parameters may be obtained based on physical room information obtained with a rendering device.

The physical room information may comprise at least one of: dimensions of the sound scene, or the geometry of the sound scene, wherein the first parameters and the second parameters may be obtained based on the physical room information and a lookup table of the rendering device, wherein the lookup table may store, in association with potential dimensions and/or geometries of the sound scene, at least one of: at least one attenuation filter coefficient, at least one delay line length, or at least one direct-to-reverberant ratio filter coefficient.

The physical room information may comprise information regarding sound reflecting elements in the geometry of the sound scene, wherein the first parameters may comprise at least one reflecting plane determined based on the information regarding the sound reflecting elements.

The first parameters may comprise at least one reflecting plane, the example embodiment further comprising program instructions stored thereon which, when executed with the at least one processor, cause the at least one processor to: receive an encoder input format file; and determine importance information based on the encoder input format file, wherein the importance information may comprise at least one indication of an importance of a respective one of the at least one reflecting plane for one or more orders of early reflections.

The obtaining of the second parameters may be based, at least partially, on at least one of: an encoder input format file, an indication of a desired sound decay time per frequency, or the geometry of the sound scene.

The example embodiment may further comprise program instructions stored thereon which, when executed with the at least one processor, cause the at least one processor to: higher-order ambisonics encode the at least one reverberated signal, wherein the rendering of the at least one reverberated signal may comprise decoding the at least one encoded reverberated signal to produce a binaural or loudspeaker output, wherein the binaural or loudspeaker output may be rendered along with the at least one audio signal.

The at least one audio signal may comprise at least one of: a direct audio signal, a sound object, a channel, a higher-order ambisonics signal, or a dry audio signal.

In accordance with one aspect, an example method may be provided comprising: determining first parameters for early reflection synthesis based on a geometry of a sound scene; determining second parameters for late reverberation synthesis, wherein at least one of the first parameters or the second parameters are based, at least partially, on an input to an encoder; and transmitting at least one of: the first parameters, the second parameters, or information derived based, at least partially, on the input to the encoder with a bitstream to a decoding and/or rendering device.

In accordance with one example embodiment, an apparatus may comprise: circuitry configured to perform: determine first parameters for early reflection synthesis based on a geometry of a sound scene; determine second parameters for late reverberation synthesis, wherein at least one of the first parameters or the second parameters are based, at least partially, on an input to an encoder; and transmit at least one of: the first parameters, the second parameters, or information derived based, at least partially, on the input to the encoder with a bitstream to a decoding and/or rendering device.

In accordance with one example embodiment, an apparatus may comprise: processing circuitry; memory circuitry including computer program code, the memory circuitry and the computer program code configured to, with the processing circuitry, enable the apparatus to: determine first parameters for early reflection synthesis based on a geometry of a sound scene; determine second parameters for late reverberation synthesis, wherein at least one of the first parameters or the second parameters are based, at least partially, on an input to an encoder; and transmit at least one of: the first parameters, the second parameters, or information derived based, at least partially, on the input to the encoder with a bitstream to a decoding and/or rendering device.

In accordance with one example embodiment, an apparatus may comprise: at least one processor; and at least one memory including computer program code; the at least one memory and the computer program code configured to, with the at least one processor, cause the apparatus to: determine first parameters for early reflection synthesis based on a geometry of a sound scene; determine second parameters for late reverberation synthesis, wherein at least one of the first parameters or the second parameters are based, at least partially, on an input to an encoder; and transmit at least one of: the first parameters, the second parameters, or information derived based, at least partially, on the input to the encoder with a bitstream to a decoding and/or rendering device.

In accordance with one example embodiment, an apparatus may comprise means for performing: determining first parameters for early reflection synthesis based on a geometry of a sound scene; determining second parameters for late reverberation synthesis, wherein at least one of the first parameters or the second parameters are based, at least partially, on an input to an encoder; and transmitting at least one of: the first parameters, the second parameters, or information derived based, at least partially, on the input to the encoder with a bitstream to a decoding and/or rendering device.

In accordance with one example embodiment, a non-transitory computer-readable medium comprising program instructions stored thereon which, when executed with at least one processor, cause the at least one processor to: determine first parameters for early reflection synthesis based on a geometry of a sound scene; determine second parameters for late reverberation synthesis, wherein at least one of the first parameters or the second parameters are based, at least partially, on an input to an encoder; and transmit at least one of: the first parameters, the second parameters, or information derived based, at least partially, on the input to the encoder with a bitstream to a decoding and/or rendering device.

In accordance with one aspect, an example method may be provided comprising: obtaining first parameters for late reverberation synthesis; performing the late reverberation synthesis based on the first parameters and at least one audio signal to produce at least one diffuse reverberated signal; and rendering the at least one diffuse reverberated signal.

In accordance with one example embodiment, an apparatus may comprise: circuitry configured to perform: obtain first parameters for late reverberation synthesis; perform the late reverberation synthesis based on the first parameters and at least one audio signal to produce at least one diffuse reverberated signal; and render the at least one diffuse reverberated signal.

In accordance with one example embodiment, an apparatus may comprise: processing circuitry; memory circuitry including computer program code, the memory circuitry and the computer program code configured to, with the processing circuitry, enable the apparatus to: obtain first parameters for late reverberation synthesis; perform the late reverberation synthesis based on the first parameters and at least one audio signal to produce at least one diffuse reverberated signal; and render the at least one diffuse reverberated signal.

In accordance with one example embodiment, an apparatus may comprise: at least one processor; and at least one memory including computer program code; the at least one memory and the computer program code configured to, with the at least one processor, cause the apparatus to: obtain first parameters for late reverberation synthesis; perform the late reverberation synthesis based on the first parameters and at least one audio signal to produce at least one diffuse reverberated signal; and render the at least one diffuse reverberated signal.

In accordance with one example embodiment, an apparatus may comprise means for performing: obtaining first parameters for late reverberation synthesis; performing the late reverberation synthesis based on the first parameters and at least one audio signal to produce at least one diffuse reverberated signal; and rendering the at least one diffuse reverberated signal.

In accordance with one example embodiment, a non-transitory computer-readable medium comprising program instructions stored thereon which, when executed with at least one processor, cause the at least one processor to: obtain first parameters for late reverberation synthesis; perform the late reverberation synthesis based on the first parameters and at least one audio signal to produce at least one diffuse reverberated signal; and render the at least one diffuse reverberated signal.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

What is claimed is:

1. A method comprising:
   obtaining first parameters for early reflection synthesis based on a geometry of a sound scene;
   determining coefficients for at least one diffuse-to-direct ratio control filter based on one or more diffuse-to-direct ratio characteristics for the sound scene;
   obtaining second parameters for late reverberation synthesis, wherein the second parameters comprise, at least, the coefficients for the at least one diffuse-to-direct ratio control filter;
   performing the early reflection synthesis based on the first parameters and at least one audio signal to produce at least one early reflection signal;
   performing the late reverberation synthesis based on the second parameters and the at least one audio signal to produce a diffuse reverberated signal;
   combining the at least one early reflection signal and the diffuse reverberated signal to produce at least one reverberated signal; and
   rendering the at least one reverberated signal.

2. The method of claim 1, wherein the second parameters further comprise at least one of: at least one attenuation filter coefficient, or at least one delay line length.

3. The method of claim 1, wherein the obtaining of the first parameters and the obtaining of the second parameters comprises using information included in input to an encoder, wherein the input to the encoder comprises at least one of:
   the geometry of the sound scene, wherein the geometry of the sound scene comprises at least one of:
     one or more dimensions of the sound scene,
     one or more geometric primitives of the sound scene,
     one or more vertices of the sound scene,
     one or more mesh faces of the sound scene, or
     one or more meshes of the sound scene;
   desired reverberation characteristics of the sound scene;
   an indication of a desired sound decay time per frequency; or
   desired diffuse-to-direct ratio characteristics of the sound scene.

4. The method of claim 1, wherein the performing of the late reverberation synthesis comprises using the second parameters as input to a feedback delay network reverberator, wherein the performing of the late reverberation synthesis further comprises:
   obtaining a dimension of the geometry of the sound scene;
   determining a length of at least one delay line of the feedback delay network reverberator based on the obtained dimension; and
   determining coefficients for at least one attenuation filter of the feedback delay network reverberator based on one or more reverberation characteristics for the sound scene, wherein the second parameters further comprise the length and the coefficients for the at least one attenuation filter.

5. The method of claim 1, wherein the obtaining of the first parameters comprises determining one or more early reflection characteristics of the geometry of the sound scene.

6. The method of claim 1, wherein the obtaining of the first parameters comprises:
   obtaining one or more potential reflecting elements of the geometry of the sound scene;
   determining at least one position of at least one sound source in the sound scene;
   forming a beam from the at least one position of the at least one sound source towards a respective one of the one or more potential reflecting elements;
   determining whether the beam or a reflection of the beam hits an element of the one or more potential reflecting elements; and
   determining at least one reflecting plane of the sound scene, wherein the at least one reflecting plane comprises one or more of the one or more potential reflecting elements determined to be hit with the beam or the reflection of the beam, wherein the first parameters comprise the at least one determined reflecting plane of the sound scene.

7. The method of claim 1, wherein the obtaining of the first parameters comprises:
   obtaining one or more potential reflecting elements of the geometry of the sound scene;
   determining one or more sound sources in the sound scene;
   determining one or more positions of a simulated listener in the sound scene;
   simulating a sound ray from a respective sound source of the one or more sound sources to a respective one of the one or more potential reflecting elements and determining whether the simulated sound ray or a reflection of the simulated sound ray reflects to a respective position of the one or more positions of the simulated listener, wherein a determination that the simulated sound ray or the reflection reflects to the position further comprises incrementing a respective number of times the respective potential reflecting element reflects the simulated sound ray or the reflection towards the one or more positions of the simulated listener; and
   determining one or more reflecting planes of the one or more potential reflecting elements based, at least partially, on the respective number of times the one or more potential reflecting elements were involved in simulated sound ray reflection, wherein the first parameters comprise the one or more determined reflecting planes.

8. The method of claim 7, wherein the obtaining of the one or more potential reflecting elements of the geometry of the sound scene comprises:
   determining one or more vertices of the geometry of the sound scene;
   determining one or more faces based on the one or more vertices;

calculating a respective normal of the one or more faces;
determining one or more sets of the one or more faces based on at least one shared edge; and
forming respective polygons based on the one or more sets of faces, wherein the one or more potential reflecting elements comprise the formed polygons.

9. The method of claim 1, wherein the first parameters and the second parameters are obtained based on physical room information.

10. The method of claim 1, wherein the first parameters comprise at least one reflecting plane, further comprising:
receiving an encoder input format file; and
determining importance information based on the encoder input format file, wherein the importance information comprises at least one indication of an importance of a respective one of the at least one reflecting plane for one or more orders of early reflections.

11. An apparatus comprising:
at least one processor; and
at least one non-transitory memory and computer program code, wherein the at least one memory and the computer program code are configured to, with the at least one processor, cause the apparatus to:
obtain first parameters for early reflection synthesis based on a geometry of a sound scene;
determine coefficients for at least one diffuse-to-direct ratio control filter based on one or more diffuse-to-direct ratio characteristics for the sound scene;
obtain second parameters for late reverberation synthesis, wherein the second parameters comprise, at least, the coefficients for the at least one diffuse-to-direct ratio control filter;
perform the early reflection synthesis based on the first parameters and at least one audio signal to produce at least one early reflection signal;
perform the late reverberation synthesis based on the second parameters and the at least one audio signal to produce a diffuse reverberated signal;
combine the at least one early reflection signal and the diffuse reverberated signal to produce at least one reverberated signal; and
render the at least one reverberated signal.

12. The apparatus of claim 11, wherein the second parameters further comprise at least one of:
at least one attenuation filter coefficient, or
at least one delay line length.

13. The apparatus of claim 11, wherein the obtaining of the first parameters and the obtaining of the second parameters comprises using information included in input to an encoder, wherein the input to the encoder comprises at least one of:
the geometry of the sound scene, wherein the geometry of the sound scene comprises at least one of:
one or more dimensions of the sound scene,
one or more geometric primitives of the sound scene,
one or more vertices of the sound scene,
one or more mesh faces of the sound scene, or
one or more meshes of the sound scene;
desired reverberation characteristics of the sound scene;
an indication of a desired sound decay time per frequency; or
desired diffuse-to-direct ratio characteristics of the sound scene.

14. The apparatus of claim 11, wherein the performing of the late reverberation synthesis comprises using the second parameters as input to a feedback delay network reverberator, wherein the performing of the late reverberation synthesis further comprises:
obtaining a dimension of the geometry of the sound scene;
determining a length of at least one delay line of the feedback delay network reverberator based on the obtained dimension; and
determining coefficients for at least one attenuation filter of the feedback delay network reverberator based on one or more reverberation characteristics for the sound scene, wherein the second parameters further comprise the length and the coefficients for the at least one attenuation filter.

15. The apparatus of claim 11, wherein the obtaining of the first parameters comprises determining one or more early reflection characteristics of the geometry of the sound scene.

16. The apparatus of claim 11, wherein the obtaining of the first parameters comprises:
obtaining one or more potential reflecting elements of the geometry of the sound scene;
determining at least one position of at least one sound source in the sound scene;
forming a beam from the at least one position of the at least one sound source towards a respective one of the one or more potential reflecting elements;
determining whether the beam or a reflection of the beam hits an element of the one or more potential reflecting elements; and
determining at least one reflecting plane of the sound scene, wherein the at least one reflecting plane comprises one or more of the one or more potential reflecting elements determined to be hit with the beam or the reflection of the beam, wherein the first parameters comprise the at least one determined reflecting plane of the sound scene.

17. The apparatus of claim 11, wherein the obtaining of the first parameters further comprises:
obtaining one or more potential reflecting elements of the geometry of the sound scene;
determining one or more sound sources in the sound scene;
determining one or more positions of a simulated listener in the sound scene;
simulating a sound ray from a respective one of the one or more sound sources to a respective element of the one or more potential reflecting elements and determining whether the simulated sound ray or a reflection of the simulated sound ray reflects to a position of the one or more positions of the simulated listener, wherein a determination that the simulated sound ray or the reflection reflects to the position further comprises incrementing a respective number of times the respective potential reflecting element reflects the simulated sound ray or the reflection towards the one or more positions of the simulated listener; and
determining one or more reflecting planes of the one or more potential reflecting elements based, at least partially, on the respective number of times the one or more potential reflecting elements were involved in simulated sound ray reflection, wherein the first parameters comprise the one or more determined reflecting planes.

18. The apparatus of claim 11, wherein the first parameters comprise at least one reflecting plane, wherein the at least one memory and the computer program code are configured to, with the at least one processor, cause the apparatus to:

receive an encoder input format file; and determine importance information based on the encoder input format file, wherein the importance information comprises at least one indication of an importance of a respective one of the at least one reflecting plane for one or more orders of early reflections.

19. A non-transitory computer-readable medium comprising program instructions stored thereon which, when executed with at least one processor, cause the at least one processor to:

obtain first parameters for early reflection synthesis based on a geometry of a sound scene;

determine coefficients for at least one diffuse-to-direct ratio control filter based on one or more diffuse-to-direct ratio characteristics for the sound scene;

obtain second parameters for late reverberation synthesis, wherein the second parameters comprise, at least, the coefficients for the at least one diffuse-to-direct ratio control filter;

perform the early reflection synthesis based on the first parameters and at least one audio signal to produce at least one early reflection signal;

perform the late reverberation synthesis based on the second parameters and the at least one audio signal to produce a diffuse reverberated signal;

combine the at least one early reflection signal and the diffuse reverberated signal to produce at least one reverberated signal; and render the at least one reverberated signal.

20. A method comprising:

determining coefficients for at least one diffuse-to-direct ratio control filter based on one or more diffuse-to-direct ratio characteristics for a sound scene;

obtaining first parameters for late reverberation synthesis, wherein the first parameters comprise, at least, the coefficients for the at least one diffuse-to-direct ratio control filter;

performing the late reverberation synthesis based on the first parameters and at least one audio signal to produce at least one diffuse reverberated signal; and rendering the at least one diffuse reverberated signal.

* * * * *